United States Patent
Kiyoshige

(10) Patent No.: US 9,338,821 B2
(45) Date of Patent: May 10, 2016

(54) CONTENT TRANSMISSION TERMINAL, SERVICE PROVIDING DEVICE, COMMUNICATION SYSTEM, COMMUNICATION METHOD, AND COMPUTER-READABLE RECORDING DEVICE FOR RECORDING PROGRAM

(71) Applicant: OLYMPUS CORPORATION, Tokyo (JP)

(72) Inventor: Ryuichi Kiyoshige, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 197 days.

(21) Appl. No.: 14/035,394

(22) Filed: Sep. 24, 2013

(65) Prior Publication Data

US 2014/0122561 A1 May 1, 2014

(30) Foreign Application Priority Data

Oct. 31, 2012 (JP) .................................. 2012-240510

(51) Int. Cl.
*G06F 15/16* (2006.01)
*H04W 88/06* (2009.01)
*H04W 48/18* (2009.01)
*H04W 84/18* (2009.01)

(52) U.S. Cl.
CPC .............. *H04W 88/06* (2013.01); *H04W 48/18* (2013.01); *H04W 84/18* (2013.01); *Y02B 60/50* (2013.01)

(58) Field of Classification Search
CPC combination set(s) only.
See application file for complete search history.

(56) References Cited

FOREIGN PATENT DOCUMENTS

| JP | 2004-023613 A | 1/2004 |
| JP | 2010-114908 A | 5/2010 |
| JP | 2012-129916 A | 7/2012 |
| JP | 2013-514000 A | 4/2013 |
| JP | 2013-544456 A | 12/2013 |
| WO | 2011-081705 A2 | 7/2011 |
| WO | 2012-040567 A1 | 3/2012 |

OTHER PUBLICATIONS

IEEE Computer Society, "Wireless LAN Medium Access Control (MAC) and Physical Layer (PHY) Specifications", IEEE, 2007, vol. 802.11. Cited in the specification.
Notice of Allowed Claims dated Oct. 13, 2012, issued in corresponding Japanese Application No. 2012-240510, w/English translation. (16 pages).
Notice of Allowance dated Jan. 13, 2015, issued in corresponding Japanese Application No. 2012-240510, w/English translation. (6 pages).

*Primary Examiner* — Saket K Daftuar
(74) *Attorney, Agent, or Firm* — Westerman, Hattori, Daniels & Adrian, LLP

(57) ABSTRACT

A content transmission terminal, a service providing device, a communication system, a method of communicating and a computer-readable recording device for recording a program that more reliably detect a communication partner, and suppress an influence on communication performed by another device connected to a specific network are provided. A response request message for requesting a response from a service providing device is transmitted from the first communication unit through first communication via a first network including an access point and wireless second communication via a second network without the first network. When a response message is received in both of the first and second communication units from the service providing device that provides a desired service, content is wirelessly transmitted from the second communication unit to the service providing device.

20 Claims, 16 Drawing Sheets

FIG. 14

| ACTION | SERVICE | SERVICE PROVIDING DEVICE |
|---|---|---|
| REPRODUCTION | VIDEO REPRODUCTION | TELEVISION |
| | | PROJECTOR |
| | | PERSONAL COMPUTER |
| | AUDIO REPRODUCTION | SPEAKER |
| STORAGE | COPY | HDD RECORDER |
| | | PERSONAL COMPUTER |
| PRINTING | PRINTING | PRINTER |

FIG. 15

| ACTION | TYPE OF CONTENT | AVAILABLE SERVICE |
|---|---|---|
| REPRODUCTION | jpeg, gif, png | VIDEO REPRODUCTION |
| | avi, mov, mpeg | VIDEO REPRODUCTION AUDIO REPRODUCTION |
| | wav, mp3, aac | AUDIO REPRODUCTION |
| STORAGE | avi, mov, mpeg | COPY |
| | wav, mp3, aac | |
| | jpeg, gif, png | |
| PRINTING | jpeg, gif, png | PRINTING |

FIG. 16A

■FORMAT

| OWN ADDRESS | SEARCH SCOPE |
|---|---|

■MESSAGE EXAMPLE

| 192.168.100.10 | 3 |
|---|---|

FIG. 16B

■FORMAT (SERVICE IS SPECIFIED)

| OWN ADDRESS | SEARCH SCOPE | SERVICE IDENTIFIER |
|---|---|---|

■MESSAGE EXAMPLE (SERVICE IS SPECIFIED)

| 192.168.100.10 | 3 | video |
|---|---|---|

FIG. 17

■FORMAT

| OWN ADDRESS | SERVICE IDENTIFIER | CLASSIFICATION |
|---|---|---|

■MESSAGE EXAMPLE

| 192.168.100.10 | video | tv |
|---|---|---|

FIG. 18

■FORMAT

| OWN ADDRESS | ELEMENT | NETWORK CONNECTION PARAMETER ||
|---|---|---|---|
| | | SSID | PASSPHRASE |

■MESSAGE EXAMPLE

| 192.168.100.10 | 1 | microAP | 1234567890 |
|---|---|---|---|

| 192.168.100.10 | 0 |
|---|---|

FIG. 19

| SERVICE | IDENTIFIER |
|---|---|
| VIDEO REPRODUCTION | video |
| AUDIO REPRODUCTION | audio |
| COPY | copy |
| PRINTING | print |

FIG. 20

| SERVICE PROVIDING DEVICE | CLASSIFICATION |
|---|---|
| TELEVISION | tv |
| PROJECTOR | prj |
| PERSONAL COMPUTER | pc |
| SPEAKER | spk |
| HDD RECORDER | hddrec |
| PRINTER | prt |

FIG. 21

| ELEMENT | VALUE |
|---|---|
| CONNECT TO NETWORK | 1 |
| DO NOT CONNECT TO NETWORK | 0 |

FIG. 22

| SEARCH SCOPE | VALUE |
|---|---|
| 1m | 1 |
| 2m | 2 |
| ⋮ | ⋮ |
| Nm | N |

CONTENT TRANSMISSION TERMINAL, SERVICE PROVIDING DEVICE, COMMUNICATION SYSTEM, COMMUNICATION METHOD, AND COMPUTER-READABLE RECORDING DEVICE FOR RECORDING PROGRAM

BACKGROUND OF THE INVENTION

1. Field of the Invention

The present invention relates to technology for detecting a service providing device that provides a service corresponding to content over a network.

Priority is claimed on Japanese Patent Application No. 2012-240510, filed on Oct. 31, 2012, the content of which is incorporated herein by reference.

2. Description of Related Art

Recently, devices that have a network function and reproduce images or sound that can be shared over a network have begun to spread. Since image or audio data has a large amount of data, communication of such data is likely to occupy a bandwidth. Therefore, performing such data communication through an access point may cause, for example, a decrease in a communication rate, with respect to communication performed by another device connected to the access point. Accordingly, it is ideal to configure the network with only devices performing this data communication and to perform direct communication between the devices.

Given the above circumstances, a method in which a wireless LAN is set between specific communication partners and an image or sound is shared is considered. For example, a Wi-Fi Direct (Wi-Fi Peer-to-Peer (P2P)) specification is known as a method of configuring a wireless LAN network between specific devices.

In a home, a device such as a TV or an audio device is fixed at a specific location. According to a procedure of Wi-Fi Direct, in order to connect with the device according to a purpose, it is necessary for a user to perform a series of operations at an installation location of the device. Therefore, in Wi-Fi Direct, it is difficult to reliably detect the presence of the communication partner and to implement a simple network connection according to a purpose.

Japanese Unexamined Patent Application, First Publication No. 2012-129916 discloses a method of communicating that uses a wireless communication system having no directivity such as Wi-Fi to specify a partner to be communicated with. In this method, a terminal that searches for another terminal searches for the other terminal while a transmission output of its communication interface is adjusted and determines the communication partner.

SUMMARY OF THE INVENTION

According to a first aspect of the present invention, a content transmission terminal that performs first communication via a first network including an access point, wirelessly performs second communication via a second network without the first network, which includes a first communication unit configured to perform the first communication with a service providing device that provides a service corresponding to content and controls an output level of wireless transmission, a second communication unit configured to perform the second communication with the service providing device, a selecting unit configured to select the service, an output level determining unit configured to determine an output level of wireless transmission for communicating with the service providing device, a response control unit configured to transmit, from the first communication unit to the service providing device, a response request message for requesting a response of the first and second communication from the service providing device and instruction information for setting an output level when the service providing device wirelessly transmits a response message corresponding to the response request message to the output level determined by the output level determining unit, and a device determining unit configured to determine the service providing device of a communication partner which performs wireless communication of the content based on the service selected by the selecting unit and on the response message received in the first and second communication units from the service providing device, wherein, after the response control unit transmits the response request message and the instruction information from the first communication unit to the service providing device, in a first case in which the response message is received in the first and second communication units from the service providing device that provides the service selected by the selecting unit, the device determining unit determines the service providing device that has transmitted a corresponding response message is determined as the communication partner, and the second communication unit wirelessly transmits content to the service providing device of the communication partner, in a second case, other than that of the first case, in which the response message is received in only the first communication unit from the service providing device that provides the service selected by the selecting unit, the output level determining unit determines a higher output level than the output level determined before transmission of the previous response request message, and the response control unit transmits the response request message and the instruction information from the first communication unit to the service providing device, and in a third case, other than those of the first and second cases, in which the response message is not received in the first communication unit from the service providing device that provides the service selected by the selecting unit, the second communication unit does not wirelessly transmit content.

According to a second aspect of the present invention, the content transmission terminal according to the first aspect is configured so that, in the first case, the second communication unit wirelessly transmits the content to the service providing device of the communication partner with an output level corresponding to the output level determined by the output level determining unit According to a third aspect of the present invention, the content transmission terminal according to the first aspect, further includes a storage unit that stores information indicating a corresponding relationship between a service and the service providing device, wherein the device determining unit determines the service providing device of the communication partner that performs wireless communication of the content based on the service selected by the selecting unit, the information stored in the storage unit, and the response message received in the first and second communication units from the service providing device.

According to a fourth aspect of the present invention, the content transmission terminal according to the first aspect is configured so that the response control unit transmits the response request message including the instruction information from the first communication unit to the service providing device.

According to a fifth aspect of the present invention, the content transmission terminal according to the first aspect is configured so that the first communication is wired communication.

According to a sixth aspect of the present invention, the content transmission terminal according to the first aspect is configured so that, in the first case, the second communication unit serves as the access point.

According to a seventh aspect of the present invention, the content transmission terminal according to the first aspect is configured so that, in the first case, when the response message is received in the first and second communication units from the plurality of service providing devices that provide the service selected by the selecting unit, the device determining unit determines the service providing device selected based on a user instruction from among the plurality of service providing devices that have transmitted the response message as the communication partner.

According to an eighth aspect of the present invention, the content transmission terminal according to the first aspect is configured so that, in the third case, the response control unit controls to transmit, from the first communication unit, a notification message for notifying that wireless transmission of the content is not performed to the service providing device that the response message is received in the first communication unit and the response message is not received in the second communication unit.

According to a ninth aspect of the present invention, the content transmission terminal according to the first aspect is configured so that the response control unit transmits the response request message, the instruction information, and service information indicating the service selected by the selecting unit from the first communication unit to the service providing device, and the device determining unit determines the service providing device of the communication partner that performs wireless communication of content based on the response message received in the first and second communication units from the service providing device that receives the response request message and the instruction information and provides the service indicated by corresponding service information.

According to a tenth aspect of the present invention, the content transmission terminal according to the first aspect, further includes a storage unit that stores information indicating a corresponding relationship among a service, a type of content, and the service providing device, wherein the selecting unit selects the service and the type of content, and the device determining unit determines the service providing device of the communication partner that performs wireless communication of content based on the service and the type of content selected by the selecting unit, the information stored in the storage unit, and the response message received in the first and second communication units from the service providing device.

According to an eleventh aspect of the present invention, service providing device includes a first communication unit configured to perform first communication via a first network including an access point, wirelessly perform second communication via a second network without the first network, and perform the first communication with a content transmission terminal that wirelessly transmits content, a second communication unit configured to perform the second communication with the content transmission terminal, a response unit configured to, when a response request message for requesting a response of the first and second communication, and instruction information for setting an output level when a response message corresponding to the response request message is wirelessly transmitted, are received in the first communication unit from the content transmission terminal, set an output level of the second communication unit to the output level based on the instruction information, and transmits the response message from the first and second communication units to the content transmission terminal, and a service providing unit configured to provide a service corresponding to the content which is transmitted from the content transmission terminal and be wirelessly received in the second communication unit after the response message is transmitted.

According to a twelfth aspect of the present invention, the service providing device according to the eleventh aspect is configured so that, when the response request message including the instruction information is received in the first communication unit from the content transmission terminal, the response unit sets an output level of the second communication unit to the output level based on the instruction information, and transmits the response message from the first and second communication units to the content transmission terminal.

According to a thirteenth aspect of the present invention, the service providing device according to the eleventh aspect is configured so that the first communication is wired communication.

According to a fourteenth aspect of the present invention, the service providing device according to the eleventh aspect is configured so that, when a notification message for notifying that wireless transmission of the content is not performed is received in the first communication unit from the content transmission terminal, the response unit stops the second communication unit.

According to a fifteenth aspect of the present invention, the service providing device according to the eleventh aspect is configured so that, when the response request message, the instruction information, and service information indicating the service selected by the content transmission terminal are received in the first communication unit from the content transmission terminal, and an own service providing device provides the service indicated by the service information, the response unit sets an output level of the second communication unit to the output level based on the instruction information and transmits the response message from the first and second communication units to the content transmission terminal.

According to a sixteenth aspect of the present invention, a communication system communication system having a content transmission terminal and a service providing device that perform first communication via a first network including an access point and wirelessly perform second communication via a second network without the first network, wherein the content transmission terminal includes a first communication unit configured to perform the first communication with the service providing device, a second communication unit configured to perform the second communication with the service providing device, a selecting unit configured to select a service, an output level determining unit configured to determine an output level of wireless transmission for communicating with the service providing device, a response control unit configured to transmit, from the first communication unit to the service providing device, a response request message for requesting a response of the first and second communication from the service providing device and instruction information for setting an output level when the service providing device wirelessly transmits a response message corresponding to the response request message to the output level determined by the output level determining unit, and a device determining unit configured to determine the service providing device of a communication partner which performs wireless communication of the content based on the service selected by the selecting unit and the response message received in the first and second communication units from the service providing device, wherein, after the response control unit transmits the response request message and the instruction information from the first communication unit to the service providing device, in a first case in which the response message is received in the first and second communication units from the service providing device that provides the service selected by the selecting unit, the device determining unit determines the service providing device that has transmitted a corresponding response message is determined as the communication partner, and the second communication unit wirelessly transmits content to the service providing device of the communication partner, in a second case, other than that of the first case, in which the response message is received in only the first communication unit from the service providing device that provides the service selected by the selecting unit, the output level determining unit determines a higher output level than the output level determined before transmission of the previous response request message, and the response control unit transmits the response request message and the instruction information from the first communication unit to the service providing device, and in a third case, other than those of the first and second cases, in which the response message is not received in the first communication unit from the service providing device that provides the service selected by the selecting unit, the second communication unit does not wirelessly transmit the content, and wherein the service providing device, which controls an output level of wireless transmission, includes a third communication unit configured to perform the first communication with the content transmission terminal, a fourth communication unit configured to perform the second communication with the content transmission terminal, a response unit configured to, when the response request message and the instruction information are received in the third communication unit from the content transmission terminal, set an output level of the fourth communication unit to the output level based on the instruction information, and transmit the response message from the third and fourth communication units to the content transmission terminal, and a service providing unit configured to provide a service corresponding to the content which is transmitted from the content transmission terminal and is wirelessly received in the fourth communication unit after the response message is transmitted.

According to a seventeenth aspect of the present invention, a communication method performed by a content transmission terminal configured to perform first communication via a first network including an access point, wirelessly perform second communication via a second network without the first network, and control an output level of wireless transmission, and includes a first communication unit that performs the first communication with a service providing device which provides a service corresponding to content and controls an output level of wireless transmission, and a second communication unit that performs the second communication with the service providing device, includes selecting the service, determining an output level of wireless transmission for communicating with the service providing device, transmitting a response request message for requesting a response of the first and second communication from the service providing device and instruction information for setting an output level when the service providing device wirelessly transmits a response message corresponding to the response request message to the determined output level from the first communication unit to the service providing device, and determining the service providing device of a communication partner which performs wireless communication of the content based on the selected service and the response message received in the first and second communication units from the service providing device, wherein, after the response request message and the instruction information are transmitted from the first communication unit to the service providing device, in a first case in which the response message is received in the first and second communication units from the service providing device that provides the selected service, the service providing device that has transmitted a response message is determined as the communication partner, and the content is wirelessly transmitted from the second communication unit to the service providing device of the communication partner, in a second case, other than that of the first case, in which the response message is received in only the first communication unit from the service providing device that provides the selected service, a higher output level than the output level determined before transmission of the previous response request message is determined, and the response request message and the instruction information are transmitted from the first communication unit to the service providing device, and in a third case, other than those of the first and second cases, in which the response message is not received in the first communication unit from the service providing device that provides the selected service, the content is not wirelessly transmitted from the second communication unit.

According to an eighteenth aspect of the present invention, a communication method performed by a service providing device configured to perform first communication via a first network including an access point and wirelessly perform second communication via a second network without the first network, and includes a first communication unit which performs the first communication with a content transmission terminal that wirelessly transmits content, and a second communication unit which performs the second communication with the content transmission terminal, the method, includes when a response request message for requesting a response of the first and second communication, and instruction information for setting an output level when a response message corresponding to the response request message is wirelessly transmitted are received in the first communication unit from the content transmission terminal, setting an output level of the second communication unit to the output level based on the instruction information and transmitting the response message from the first and second communication units to the content transmission terminal, and providing a service corresponding to the content which is transmitted from the content transmission terminal and is wirelessly received in the second communication unit after the response message is transmitted.

According to a nineteenth aspect of the present invention, a computer-readable recording device that records a program executed by a computer of a content transmission terminal configured to perform first communication via a first network including an access point, wirelessly perform second communication via a second network without the first network and control an output level of wireless transmission, and includes a first communication unit which performs the first communication with a service providing device that provides a service corresponding to content and controls an output level of wireless transmission, and a second communication unit which performs the second communication with the service providing device, the program causing the computer to execute, selecting the service, determining an output level of wireless transmission for communicating with the service providing device, transmitting a response request message for requesting a response of the first and second communication from the service providing device and instruction information for setting an output level when the service providing device wirelessly transmits a response message corresponding to the response request message to the determined output level, from the first communication unit to the service providing device, and determining the service providing device of a communication partner which performs wireless communication of content based on the selected service and the response message received in the first and second communication units from the service providing device, wherein, after the response request message and the instruction information are transmitted from the first communication unit to the service providing device, in a first case in which the response message is received in the first and second communication units from the service providing device that provides the selected service, the service providing device that has transmitted a response message is determined as the communication partner, and the content is wirelessly transmitted from the second communication unit to the service providing device of the communication partner, in a second case, other than that of the first case, in which the response message is received in only the first communication unit from the service providing device that provides the selected service, a higher output level than the output level determined before transmission of the previous response request message is determined, and the response request message and the instruction information are transmitted from the first communication unit to the service providing device, and in a third case, other than those of the first and second cases, in which the response message is not received in the first communication unit from the service providing device that provides the selected service, the content is not wirelessly transmitted from the second communication unit.

According to a twentieth aspect of the present invention, a computer-readable recording device that records a program executed by a computer of a service providing device configured to perform first communication via a first network including an access point and wirelessly perform second communication via a second network without the first network, and includes a first communication unit which performs the first communication with a content transmission terminal that wirelessly transmits content and a second communication unit which performs the second communication with the content transmission terminal, the program causing the computer to execute, when a response request message for requesting a response of the first and second communication, and instruction information for setting an output level when a response message corresponding to the response request message is wirelessly transmitted are received in the first communication unit from the content transmission terminal, setting an output level of the second communication unit to the output level based on the instruction information and transmitting the response message from the first and second communication units to the content transmission terminal, and providing a service corresponding to the content which is transmitted from the content transmission terminal and is wirelessly received in the second communication unit after the response message is transmitted.

BRIEF DESCRIPTION OF THE DRAWINGS

FIG. 14 is a reference diagram illustrating a corresponding relationship among an action, a service, and the service providing device according to the embodiment of the invention.

FIG. 15 is a reference diagram illustrating a corresponding relationship among an action, a type of content, and a service according to the embodiment of the invention.

FIGS. 16A and 16B are reference diagrams illustrating a format of a search message and an example of the search message according to the embodiment of the invention.

FIG. 17 is a reference diagram illustrating a format of a search response message and an example of the search response message according to the embodiment of the invention.

FIG. 18 is a reference diagram illustrating a format of a search-completion notification message and an example of the search-completion notification message according to the embodiment of the invention.

FIG. 19 is a reference diagram illustrating a corresponding relationship between a service and a service identifier according to the embodiment of the invention.

FIG. 20 is a reference diagram illustrating a corresponding relationship between the service providing device and a classification thereof according to the embodiment of the invention.

FIG. 21 is a reference diagram illustrating an example of an element included in the search-completion notification message according to the embodiment of the invention.

FIG. 22 is a reference diagram illustrating values that can be specified as the search scope according to the embodiment of the invention.

DETAILED DESCRIPTION OF THE INVENTION

Hereinafter, embodiments of the invention will be described with reference to the accompanying drawings.

(Network Configuration)

Figure 1:
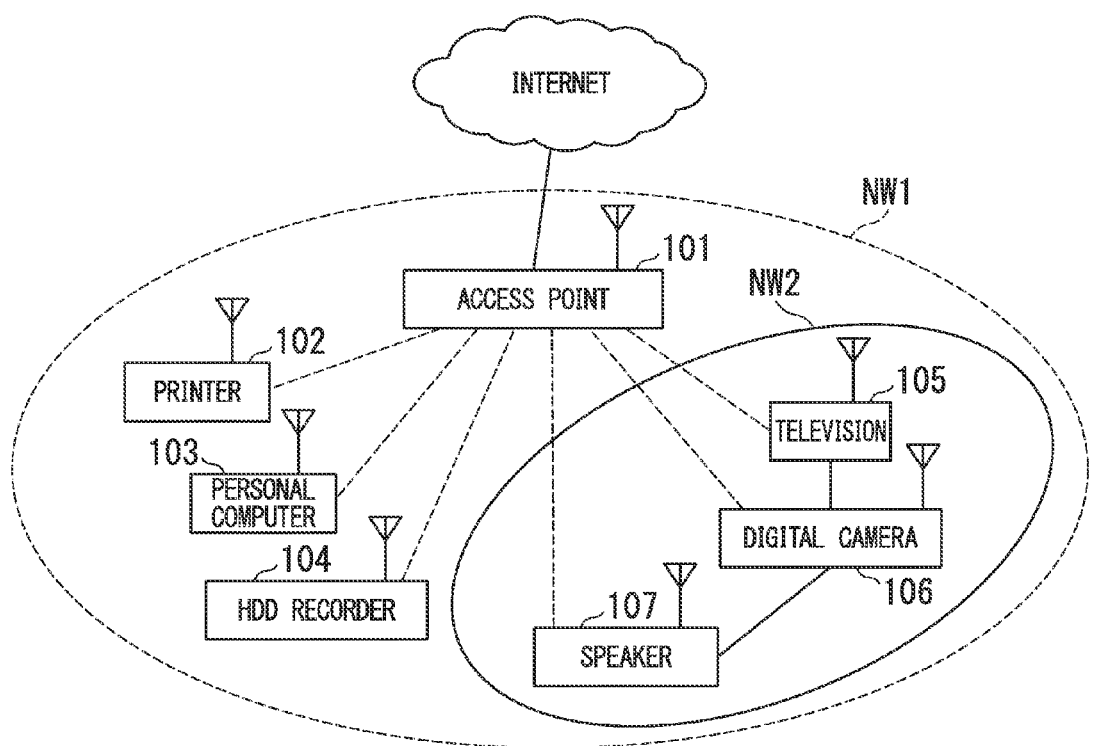
FIG. 1 is a diagram illustrating a configuration of a communication system according to an embodiment of the invention.

FIG. 1 is a diagram illustrating a configuration of a communication system according to the embodiment of the invention. As illustrated in FIG. 1, an object of the embodiment is to build a second network NW2 within a first network NW1 to which an access point 101 is connected. More specifically, in a network environment in which the access point 101 having a broadband router function is provided, the first network NW1 in which a printer 102, a personal computer 103, an HDD recorder 104, a TV 105, a digital camera 106, and a speaker 107 communicate with each other through the access point 101 is configured. These terminals can communicate with each other through the access point 101 and can also connect to the Internet.

In the embodiment, for example, the digital camera 106 serves as a content transmission terminal for transmitting image or sound data (content) to another device. Moreover, the printer 102, the personal computer 103, the HDD recorder 104, the TV 105, or the speaker 107 serves as a service providing device for providing a service corresponding to the video or sound data transmitted from the digital camera 106. For example, the printer 102 provides a printing service for printing received data. The HDD recorder 104 provides a storing (copy) service for storing received data. The TV 105 provides a video reproducing service for reproducing received image data. The personal computer 103 provides a storing (copy) service and a video reproducing service. The speaker 107 provides an audio reproducing service for reproducing received sound data.

In the embodiment, for example, the TV 105, the digital camera 106, and the speaker 107 configure the second network NW2, which is different from the first network NW1. In the second network NW2, as illustrated in FIG. 1, the terminals communicate with each other without the access point 101. The second network NW2 is built by the digital camera 106 in order to reproduce images captured by the digital camera 106 using the TV 105 and the speaker 107. When the second network NW2 is built, the digital camera 106 searches for a device other than the camera itself, and builds the second network NW2 between the device detected by searching and the camera. In this case, the digital camera 106 preferentially selects a device in a close distance from the camera itself. A method of building the second network NW2 will be described below.

(Device Configuration)

Figure 2:
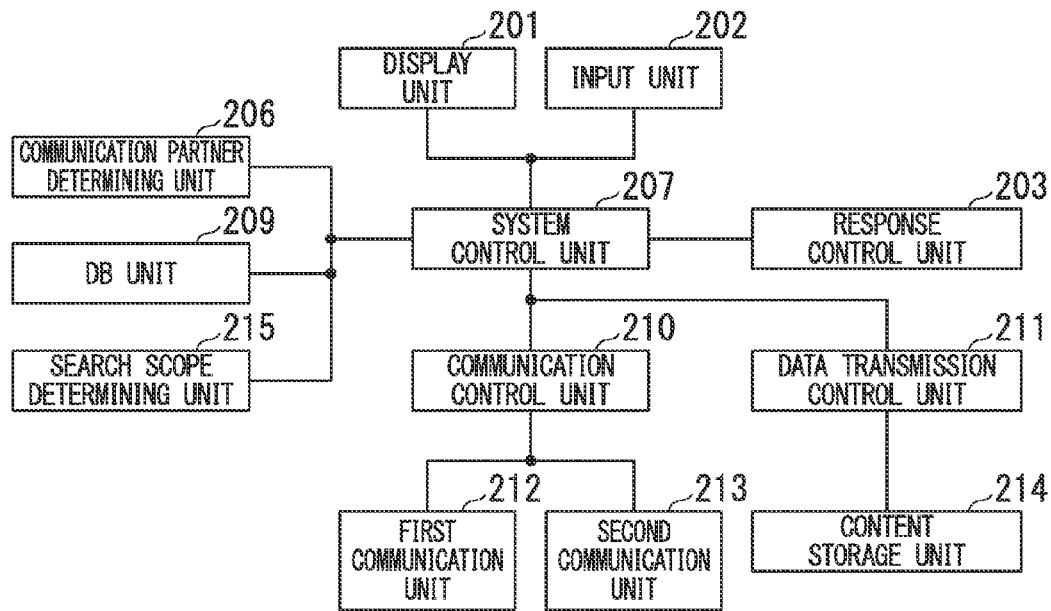
FIG. 2 is a block diagram illustrating a configuration of a content transmission terminal according to the embodiment of the invention.
Figure 3:
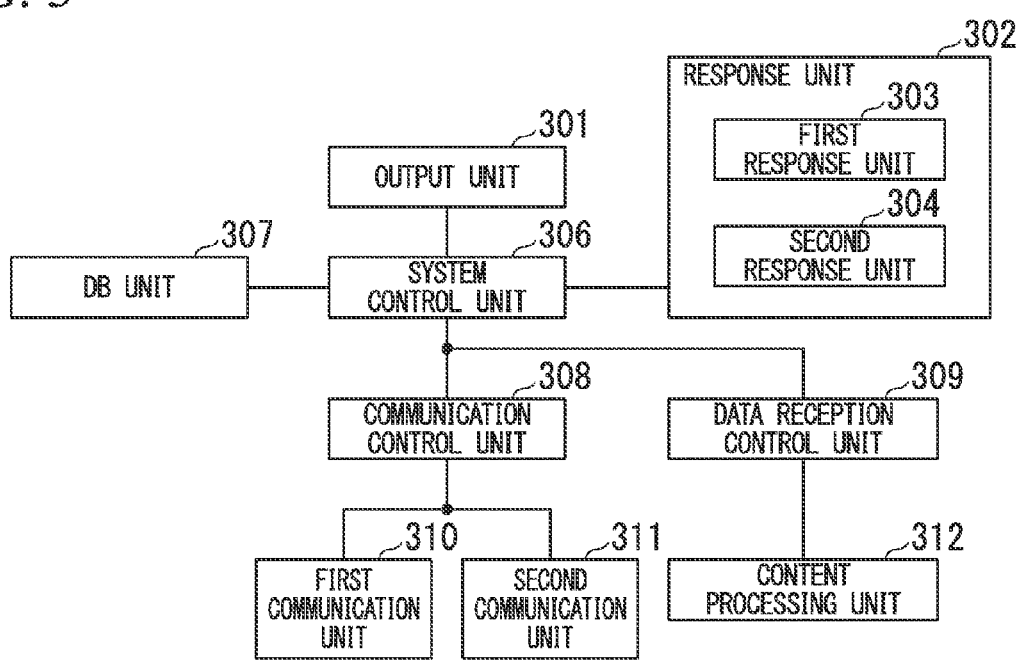
FIG. 3 is a block diagram illustrating a configuration of a service providing device according to the embodiment of the invention.

FIGS. 2 and 3 illustrate a configuration of the device according to the embodiment of the invention. FIG. 2 is a diagram illustrating a configuration of the content transmission terminal (for example, the digital camera 106) that detects a service providing device. FIG. 3 is a diagram illustrating a configuration of the service providing device, for example, the TV 105 or the speaker 107, which is to be detected by the content transmission terminal.

As illustrated in FIG. 2, the content transmission terminal includes a display unit 201, an input unit 202, a response control unit 203, a communication partner determining unit 206, a system control unit 207, a DB unit 209, a communication control unit 210, a data transmission control unit 211, a first communication unit 212, a second communication unit 213, a content storage unit 214, and a search scope determining unit 215.

The display unit 201 displays, for example, a menu for a user input and a processing result. The input unit 202 includes a member, for example, a button or a switch that the user operates to input information. Through operation of these members, the system control unit 207 is notified of the input information. The response control unit 203 includes parameters (instruction information) for devices present in the first network NW1 to instruct adjustment of a transmission output (output level) of the second communication unit 311 (FIG. 3) included in the devices. The response control unit 203 performs control such that a search message (response request message) is transmitted from the first communication unit 212 in order to request a response using the first communication unit 310 (FIG. 3) and the second communication unit 311 included in the devices.

The communication partner determining unit 206 determines a device which is connected to the second network NW2 through the second communication unit 213 and is used as a partner to be communicated with in the first network NW1. The system control unit 207 controls an entire system of the digital camera 106. The DB unit 209 (storage unit) holds information used for the communication partner determining unit 206 to determine a communication partner device.

The communication control unit 210 controls communication of the first and second communication units 212 and 213 by setting network connection parameters. Moreover, the communication control unit 210 adjusts a transmission output of the second communication unit 213 that performs wireless communication. When content data such as images or sounds stored in the content storage unit 214 is transmitted, the data transmission control unit 211 generates a real-time transport protocol (RTP) data packet from the content data and performs data transmission control, for example, flow control.

The first communication unit 212 performs communication (first communication) with a device connected to the first network NW1 via the first network NW1. The second communication unit 213 performs communication (second communication) with a device connected to the second network NW2 via the second network NW2. According to the embodiment, for example, the first communication unit 212 performs wired communication and the second communication unit 213 performs wireless communication. However, the first communication unit 212 may also perform wireless communication. The content storage unit 214 includes a recording medium to store content data such as images or sounds.

The search scope determining unit 215 determines parameters for adjusting a transmission output of the second communication unit 311 (FIG. 3) included in the device present in the first network NW1. The parameters determined by the search scope determining unit 215 are included in the search message transmitted from the first communication unit 212 described above.

Functions of the response control unit 203, the communication partner determining unit 206, the system control unit 207, the communication control unit 210, the data transmission control unit 211, and the search scope determining unit 215 are implemented such that, for example, a computer (CPU) of the content transmission terminal loads and executes a program stored in the DB unit 209. Moreover, the program may be provided with a "computer-readable recording medium," for example, a flash memory. In addition, the above-described program may also be input to the content transmission terminal such that a computer storing the program in, for example, a storage device, transmits the program to the content transmission terminal using a transmission medium or using a transmitted wave in the transmission medium. In this case, the "transmission medium" for transmitting the program refers to a medium having a function of transmitting information, for example, a network (communication network) such as the Internet or a communication circuit (communication line) such as a telephone line. Furthermore, the above-described program may also be a program to implement a part of the above-described function. In addition, the above-described function may also be implemented in combination with a program already stored in the computer, which is a so-called differential file (differential program).

As illustrated in FIG. 3, the service providing device includes an output unit 301, a response unit 302, a system control unit 306, a DB unit 307, a communication control unit 308, a data reception control unit 309, a first communication unit 310, a second communication unit 311, and a content processing unit 312.

The output unit 301 has a function of, for example, a display or speaker member that allows the user to view images or listen to sounds. When the search message is received in the first communication unit 310, the response unit 302 generates a search response message (response message), which is a response for the search message, and transmits the search response message through the first and second communication units 310 and 311. The response unit 302 includes a first response unit 303 configured to transmit the search response message through the first communication unit 310 and a second response unit 304 configured to transmit the search response message through the second communication unit 311.

The system control unit 306 controls an entire system of the device. The DB unit 307 stores, for example, information that is necessary for the response unit 302 to generate the search response message. The communication control unit 308 controls communication of the first and second communication units 310 and 311 by setting the network connection parameters. Moreover, the communication control unit 308 adjusts a transmission output of the second communication unit 311 that performs wireless communication.

The data reception control unit 309 performs data reception control such that content data is extracted from the real-time transport protocol (RTP) data packet including the content data transmitted from the device, for example, the digital camera 106. The first communication unit 310 performs communication (first communication) with the device, for example, the digital camera 106 connected to the first network NW1, via the first network NW1. The second communication unit 311 performs communication (second communication) with the device, for example, the digital camera 106 connected to the second network NW2, via the second network NW2. According to the embodiment, for example, the communication unit 310 performs wired communication and the second communication unit 311 performs wireless communication. However, the first communication unit 310 may also perform wireless communication.

The content processing unit 312 processes the content data such as images or sounds transmitted from the device, for example, the digital camera 106, and provides a service corresponding to the content. For example, the content processing unit 312 in the printer 102 converts the data into data for printing. The content processing unit 312 in the HDD recorder 104 stores the data in the recording medium. The content processing unit 312 in the TV 105 performs a process to reproduce image data. The content processing unit 312 in the personal computer 103 stores the data in the recording medium or reproduces the image data. The content processing unit 312 in the speaker 107 performs a process to reproduce sound data.

Functions of the response unit 302, the system control unit 306, the communication control unit 308, the data reception control unit 309, and the content processing unit 312 are implemented such that, for example a computer (CPU) of the service providing device loads and executes a program stored in the DB unit 307. Moreover, the program may be provided with a "computer-readable recording medium," for example, a flash memory. In addition, the above-described program may also be input to the service providing device such that a computer storing the program in, for example, a storage device, transmits the program to the service providing device using a transmission medium or using a transmitted wave in the transmission medium In this case, the "transmission medium" for transmitting the program refers to a medium having a function of transmitting information, for example, a network (communication network) such as the Internet or a communication circuit (communication line) such as a telephone line. Furthermore, the above-described program may also be a program to implement a part of the above-described function. In addition, the above-described function may also be implemented in combination with a program already stored in the computer, which is a so-called differential file (differential program).

(Operation Sequence)

Figure 4:
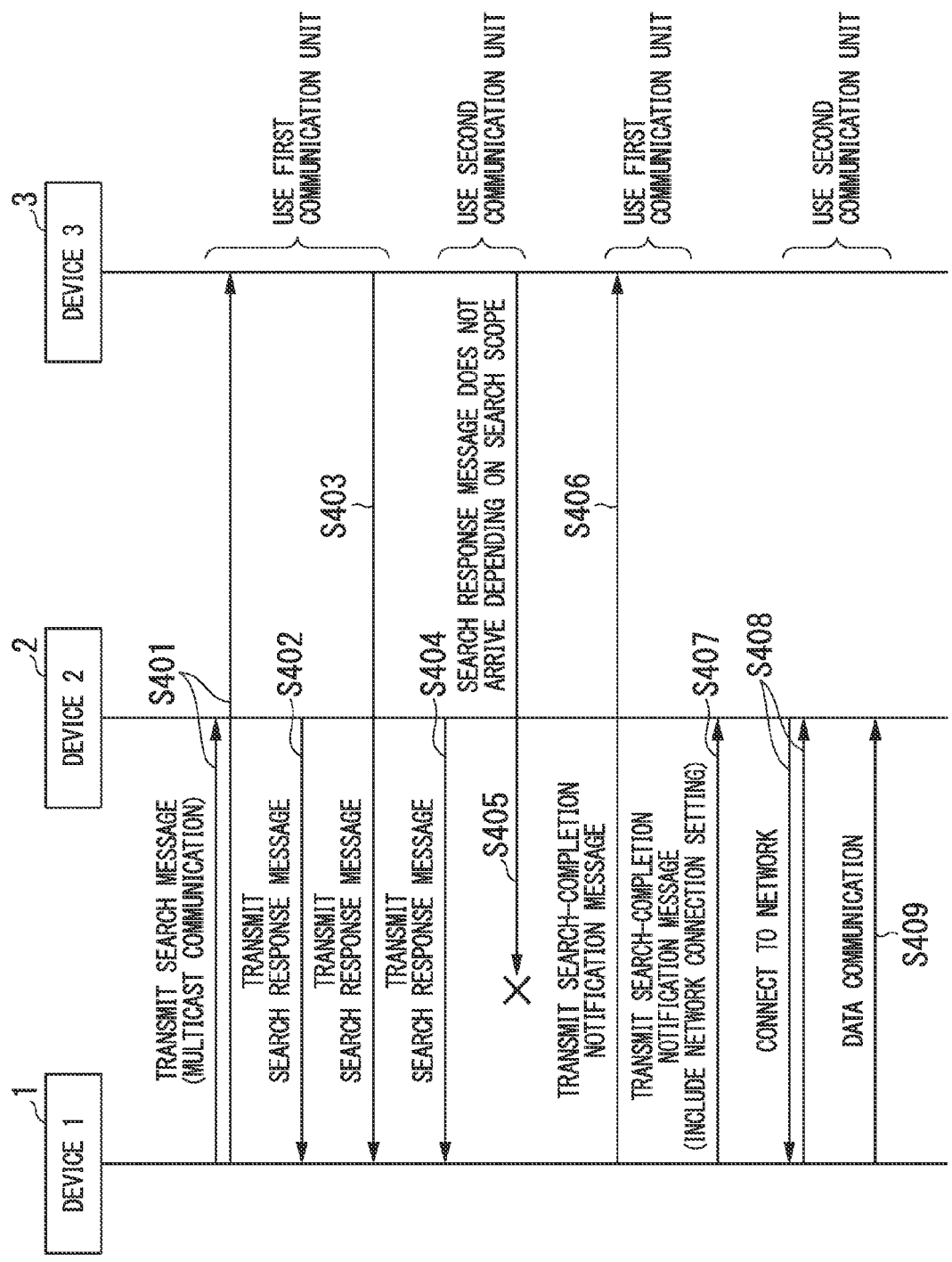
FIG. 4 is a sequence diagram illustrating operations of building a second network by a device connected to a first network according to the embodiment of the invention.

FIG. 4 illustrates operations in that the content transmission terminal connected to the first network NW1 detects a service providing device to be connected via the second network NW2, and builds the second network NW2. A message or a process is included in the following description. The detailed description of a format of the message or the process will be given below. While the devices are described as a device 1, a device 2, and a device 3 in FIG. 4, the device 1 refers to the digital camera 106, the device 2 refers to the TV 105 or the speaker 107, and the device 3 refers to a device other than the devices 1 and 2 when the network configuration in FIG. 1 is applied. The devices 1, 2, and 3 are already connected to the first network NW1 and are in a state in which they can perform secure and reliable data communication with each other.

First, the device 1 multicasts a search message for requesting a response to the devices 2 and 3 (step S401). The multicast communication is performed using the first communication unit 212 capable of communicating over the first network NW1. The devices 2 and 3 transmit a search response message using the first communication unit 310 in response to the search message (steps S402 and S403). In the communication using the first communication unit 310, data is transmitted or received using, for example, a TCP/IP protocol. Subsequently, the devices 2 and 3 transmit a search response message using the second communication unit 311 used in the second network NW2 in response to the search message in step S401 (steps S404 and S405). In the communication using the second communication unit 311, for example, a probe request or an action frame of a management frame packet defined in IEEE 802.11 is used.

The search response message transmitted from the devices 2 and 3 in steps S404 and S405 may not arrive at the device 1 depending on a transmission output state of the second communication unit 311 of the devices 2 and 3. FIG. 4 illustrates a state in which the search response message transmitted from the device 3 does not arrive at the device 1. When the search response message is received through the second communication unit 213, the device 1 transmits a search-completion notification message to the devices 2 and 3 using the first communication unit 212 (steps S406 and S407).

The device 1 determines a communication partner device based on the search response message received through the second communication unit 213, generates a different search-completion notification message for each device according to a determination result and transmits the message. In the example in FIG. 4, the search response message is received from the device 2 and the device 1 is determined to communicate with the device 2 in the second network NW2. Therefore, network connection parameters to connect with the device 1 are included in the search-completion notification message to be transmitted to the device 2 in step S407.

In order to connect with the device 1 via the second network NW2, the device 2, which has received the search-completion notification message including the network connection parameters, performs communication of exchanging a network connection request and response packet of a wireless LAN (IEEE 802.11) according to the content of the network connection parameters with the device 1, and connects to the second network NW2 (step S408). After connecting to the second network NW2, the device 1 starts to transmit content data to the device 2 (step S409). By exchanging the messages described above, it is possible to easily build a network between desired devices.

All of the devices 2 and 3 connected to the first network NW1 receive the search message. However, the search response message transmitted from the second communication unit 311 of the devices 2 and 3 may or may not be received in the device 1 according to a transmission output of the second communication unit 311 of the devices 2 and 3. In FIG. 4, the device 2 is closer to the device 1 than the device 3 and the search response message transmitted from the device 2 arrives at the device 1. However, the search response message transmitted from the device 3 does not arrive at the device 1. The transmission output of the second communication unit 311 of the devices 2 and 3 is specified in the search message transmitted from the device 1. As described above, the device 1 receives the search response message from only the device 2, which is within a desired range, in the second communication unit 311, and it is possible to build a network with the device 2.

(A Response is Received from all Devices Present in the First Network NW1)

Figure 5:
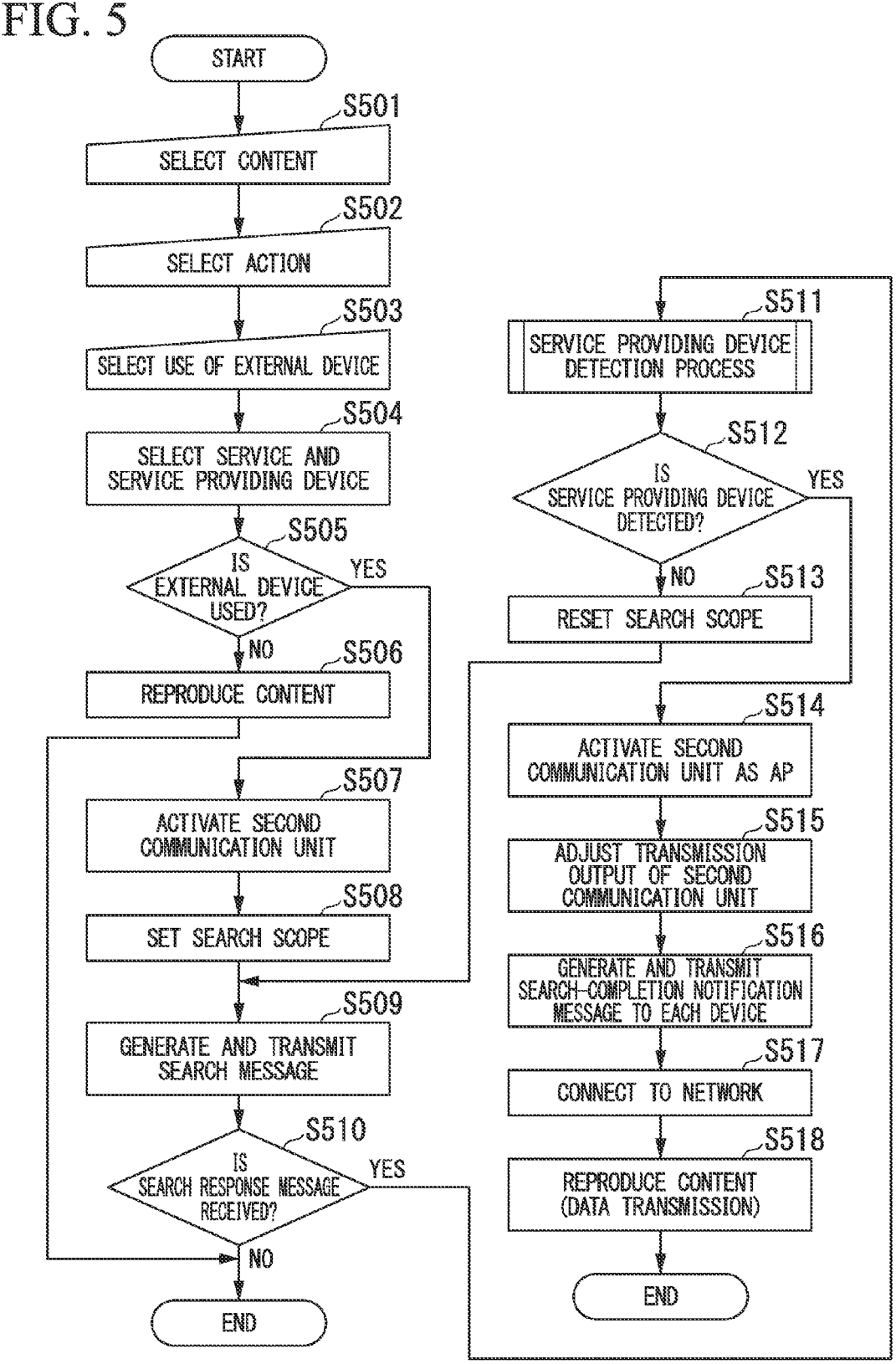
FIG. 5 is a flowchart illustrating operation procedures of the content transmission terminal according to the embodiment of the invention.

FIG. 5 illustrates a process up to operations of searching for the service providing device of the communication partner (connection partner) by the content transmission terminal and enabling data transmission by building the second network NW2.

Hereinafter, the operation of the digital camera 106 will be exemplified. According to general menu manipulation of the digital camera, the user allows a thumbnail or list of the content stored in the content storage unit 214 to be displayed on the display unit 201, and selects content to be reproduced among them (step S501). In this case, the user uses the input unit 202 to select the content. The system control unit 207 is notified by the input unit 202 of information on the content selected by the user.

Subsequently, the user selects an action corresponding to the content selected in step S501 (step S502). Further, the user selects whether the content is to be processed in the digital camera 106 or in an external device with respect to the action selected in step S502 (step S503). The input unit 202 is also used in the selecting of steps S502 and S503, and the system control unit 207 is notified by the input unit 202 of the information selected by the user.

Subsequently, the system control unit 207 selects a service corresponding to the selected content and a service providing device capable of providing the service based on the information notified of by the input unit 202 and a correspondence table stored in the DB unit 209 (step S504). Hereinafter, operations of step S504 will be described in detail. FIGS. 14 and 15 illustrate information stored in the DB unit 209.

FIG. 14 illustrates a corresponding relationship between a service corresponding to the action selected by the user and a service providing device that provides the service. As illustrated in FIG. 14, the action selected by the user in step S502 is any one of "reproduction," "storage," and "printing." Each of these actions is associated with a specific service. For example, the action of "reproduction" is associated with the service of "video reproduction" and "audio reproduction." Moreover, each service is associated with a service providing device capable of providing the service. For example, the service of "video reproduction" is associated with the service providing device of "TV," "projector," or "personal computer."

FIG. 15 illustrates a corresponding relationship between a type of content (content type) corresponding to the action selected by the user and a service for which the content type is available. Each of these actions that can be selected by the user in step S502 is associated with a specific content type. The content type is indicated in a file extension of the content. Further, each content type is associated with the service for which the content type is available.

The system control unit 207 selects a service and a service providing device corresponding to the action selected in step S502 based on the corresponding relationship information illustrated in FIG. 14. For example, when "reproduction" is selected as the action, the service may be either or both of "video reproduction," and "audio reproduction." When there are a plurality of services corresponding to the action, the system control unit 207 selects a service that corresponds to the action selected in step S502 and the content type of the content selected in step S501 based on the corresponding relationship information illustrated in FIG. 15. For example, when "reproduction" is selected as the action and content having a content type of "avi" is selected, the service is "video reproduction" and "audio reproduction."

When the content type is "avi," "mov," or "mpeg," data corresponding to these content types is video data, which includes image data and sound data. Therefore, it may use services of both "video reproduction" and "audio reproduction" and search for a device capable of providing each service. On the other hand, when the content type is "jpeg," "gif," or "prig," data corresponding to these content types is still image data and the service is only "video reproduction." For example, when "reproduction" is selected as the action and content having a content type of "avi" is selected, "TV," "projector," "personal computer," or "speaker" is selected as the service providing device based on the corresponding relationship information illustrated in FIG. 14.

The service information selected based on the corresponding relationship information illustrated in FIGS. 14 and 15 is converted into a service identifier according to corresponding relationship information illustrated in FIG. 19. FIG. 19 illustrates a corresponding relationship between the service and the service identifier. As illustrated in FIG. 19, each service such as "video reproduction" corresponds to a service identifier such as "video." The corresponding relationship information illustrated in FIG. 19 is stored in the DB unit 209. For example, when "video reproduction" is selected as the service, "video" is selected as the service identifier based on the corresponding relationship information illustrated in FIG. 19.

In addition, information on the service providing device selected based on the corresponding relationship information illustrated in FIG. 14 is converted into a classification of the service providing device according to the corresponding relationship information illustrated in FIG. 20. FIG. 20 illustrates a corresponding relationship between the service providing device and the classification thereof. As illustrated in FIG. 20, each service providing device such as "TV" corresponds to the classification such as "tv." The corresponding relationship information illustrated in FIG. 20 is stored in the DB unit 209.

For example, when "TV," "projector," "personal computer," or "speaker" is selected as the service providing device, "tv," "prj," "pc," or "spk" is selected as the classification based on the corresponding relationship information illustrated in FIG. 20.

Subsequent to step S504, the system control unit 207 determines whether a use of the external device is selected in step S503 (step S505). When the digital camera 106 is selected to process the content, the system control unit 207 reads the content data from the content storage unit 214 and performs a process according to the action selected in step S502 (step S506). For example, when "reproduction" is selected in step S502, the system control unit 207 outputs the content data read from the content storage unit 214 to the display unit 201 and displays the content on the display unit 201 in step S506.

On the other hand, when a use of the external device is selected, the system control unit 207 activates the second communication unit 213 when the second communication unit 213 is not activated (step S507). Subsequently, the system control unit 207 issues an instruction for determining a search scope to the search scope determining unit 215 and receives information on the search scope determined by the search scope determining unit 215 (step S508). The search scope is determined to receive the search response message from only the service providing device, which is within a predetermined range, in the second communication unit 213. In step S508, when the instruction is received from the system control unit 207, the search scope determining unit 215 determines the search scope and notifies the system control unit 207 of the determined search scope. At first, a narrow search scope is determined. As determination of the search scope is repeated, the search scope becomes broader in order to receive the search response message from service providing devices within a broader range. The search scope corresponds to the transmission output set in the second communication unit 311 of the device that has received the search message transmitted from the digital camera 106. The detailed description of the search scope will be described below.

After the search scope is set, the system control unit 207 generates a search message including information on the search scope and transmits the search message through the communication control unit 210 and the first communication unit 212 (step S509). FIGS. 16A and 16B illustrate a format of the search message and an example of the search message. FIG. 16A illustrates a format of the search message and an example of the search message corresponding to the operations illustrated in FIG. 5. The search message includes, for example, an own address such as an IP address indicating its own address and the search scope. In the example in FIG. 16A, the own address is the IP address (192.168.100.10) and the search scope is 3. The unit of the search scope is, for example, m (meter). Since the transmission output of the second communication unit 311 of the device that receives the search message is set based on the search scope included in the search message, the search scope information included in the search message corresponds to information instructing the transmission output of the second communication unit 311.

After the search message is transmitted, the system control unit 207 waits to receive the search response message in the first and second communication units 212 and 213 (step S510). Each of the first and second communication units 212 and 213 outputs the received search response message to the system control unit 207 through the communication control unit 210 upon receiving the search response message. The system control unit 207 also receives information that the search response message is received in either of the first and second communication units 212 and 213 when the search response message is received from the communication control unit 210.

When the search response message is not received in the first communication unit 212 within a predetermined time (for example, 10 seconds) after the search message is transmitted, it means that there is no device connected to the first network NW1 and no communication partner was found. Therefore, the system control unit 207 terminates processes. In this case, wireless communication of the content data with another device is not performed, and the second communication unit 213 activated in step S507 stops. On the other hand, when the search response message is received in at least the first communication unit 212, it means that there is a device capable of serving as the communication partner. The system control unit 207 issues an instruction for performing a service providing device detecting process of detecting a service providing device to be used as the communication partner determining unit 206, and receives the communication partner information determined by the communication partner determining unit 206 (step S511).

Figure 23:
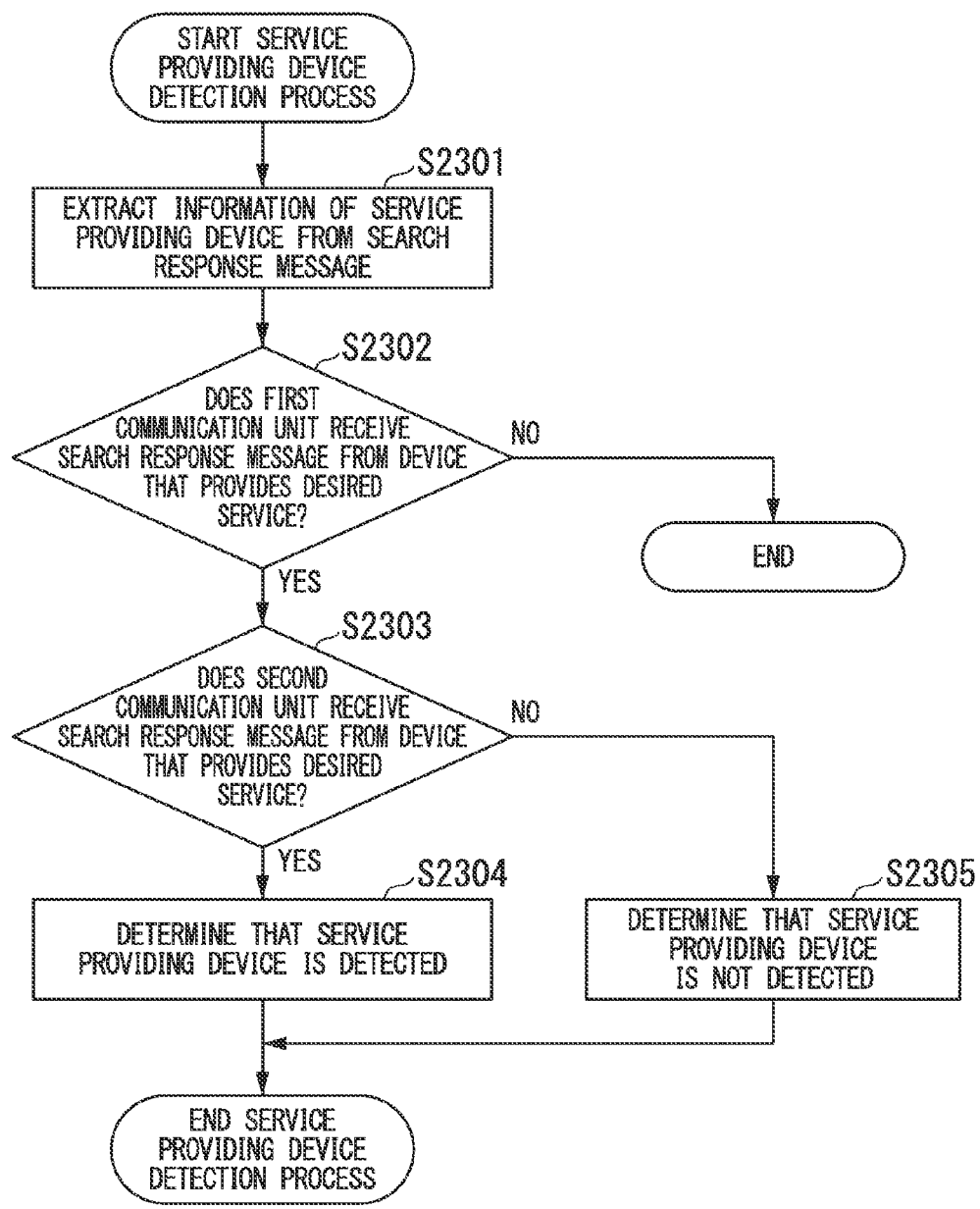
FIG. 23 is a flowchart illustrating operation procedures of the content transmission terminal according to the embodiment of the invention.

FIG. 23 illustrates details of the service providing device detecting process in step S511.

In the service providing device detecting process, the service providing device of the communication partner is selected based on the service and the service providing device selected in step S504 and the content of the received search response message.

First, the communication partner determining unit 206 extracts information of the service providing device, which is a transmission source of the search response message, from the search response message received in each of the first and second communication units 212 and 213 (step S2301). FIG. 17 illustrates a format of the search response message and an example of the search response message. The search response message includes an own address, a service identifier, and a classification of the service providing device. In the example in FIG. 17, the own address is the IP address (192.168.100.10), the service identifier is "video" (video reproduction), and the classification of the service providing device is "tv" (TV). In step S2301, this information is extracted.

Subsequently, the communication partner determining unit 206 determines whether the search response message is received in the first communication unit 212 from the device that provides a desired service (step S2302). In step S2302, the communication partner determining unit 206 checks whether a condition that a combination of the service identifier and the classification of the service providing device extracted from the search response message match a combination of the service identifier and the classification of the service providing device selected in step S504 is satisfied with respect to all search response messages received in the first communication unit 212. When the result of checking is that there is at least one search response message satisfying the condition, it is determined that the search response message is received in the first communication unit 212 from the device that provides a desired service. In addition, when the result of checking is that there is no search response message satisfying the condition, it is determined that the search response message is not received in the first communication unit 212 from the device that provides a desired service.

When the search response message is not received in the first communication unit 212 from the device that provides a desired service, the communication partner determining unit 206 terminates processes. In this case, since the device that provides a desired service is not connected to the first network NW1, it is difficult to perform, for example, content reproduction, in the external device. Moreover, when the search response message is received in the first communication unit 212 from the device that provides a desired service, the communication partner determining unit 206 determines whether the search response message is received in the second communication unit 213 from the device that provides a desired service (step S2303).

In step S2303, the communication partner determining unit 206 checks whether a condition in which a combination of the service identifier and the classification of the service providing device extracted from the search response message match a combination of the service identifier and the classification of the service providing device selected in step S504 is satisfied with respect to all search response messages received in the second communication unit 213.

When the result of checking is that there is at least one search response message satisfying the condition, it is determined that the search response message is received in the second communication unit 213 from the device that provides a desired service. In addition, when the result of checking is that there is no search response message satisfying the condition, it is determined that the search response message is not received in the second communication unit 213 from the device that provides a desired service.

When the search response message is received in the second communication unit 213 from the device that provides a desired service, the communication partner determining unit 206 determines that the service providing device is detected, and the system control unit 207 is notified of the address extracted from the search response message satisfying the condition in the checking of step S2303 as the communication partner information (step S2304). Moreover, when the search response message is not received in the second communication unit 213 from the device that provides a desired service, the communication partner determining unit 206 determines that no service providing device is detected, and the system control unit 207 is notified of the fact that no service providing device is detected (step S2305).

When the processes in steps S2304 and S2305 end, the process of detecting the service providing device ends After the service providing device detecting process ends, the system control unit 207 determines whether the service providing device is detected based on the information notified of by the communication partner determining unit 206 (step S512). When the service providing device is not detected, the system control unit 207 issues an instruction for determining the search scope to the search scope determining unit 215 and receives the search scope information determined by the search scope determining unit 215 (step S513). In step S513, when the instruction is received from the system control unit 207, the search scope determining unit 215 determines a broader search scope than the previously determined search scope and notifies the system control unit 207 of the determined search scope. Then, the process proceeds to step S509, and the search message is retransmitted. As the search scope becomes broader, in the service providing device which has received the search message, the transmission output of the second communication unit 311 is set to a higher transmission.

On the other hand, when the service providing device is detected, the system control unit 207 sets an SSID serving as an identifier of a wireless network and a passphrase serving as an encryption key to the second communication unit 213 through the communication control unit 210, and activates the second communication unit 213 as the access point (AP) (step S514). In this way, the second network NW2 is built and another device can connect to the second network NW2. Subsequently, the system control unit 207 adjusts the transmission output of the second communication unit 213 through the communication control unit 210 such that the transmission output corresponds to the search scope determined by the search scope determining unit 215 (step S515).

Subsequently, the system control unit 207 generates a search-completion notification message for each device of the transmission source of the search response message received in the first communication unit 212 and transmits the search-completion notification message to the each device through the communication control unit 210 and the first communication unit 212 (step S516). FIG. 18 illustrates a format of the search-completion notification message and an example of the search-completion notification message. The search-completion notification message includes an own address, an element, and network connection parameters.

The element indicates whether or not to connect to the network (whether wireless transmission of the content data is performed). FIG. 21 shows an example of the element. The element of the search-completion notification message to be transmitted to the device detected as the communication partner has a value of "1" indicating to connect to the network (perform wireless transmission of the content data). On the other hand, the element of the search-completion notification message transmitted to the device that is not the communication partner has a value of "0" indicating not to connect to the network (not to perform wireless transmission of the content data). The network connection parameter includes the SSID and the passphrase, which are parameters necessary for connecting to the second network NW2.

An upper example out of the search-completion notification message examples illustrated in FIG. 18 is an example of the search-completion notification message to be transmitted to the device detected as the communication partner. The element is "1" and the search-completion notification message includes the network connection parameters ("microAP" as the SSID and "1234567890" as the passphrase). In addition, a lower example out of the search-completion notification message examples illustrated in FIG. 18 is an example of the search-completion notification message transmitted to the device that is not the communication partner. The element is "0" and the search-completion notification message is not included. When the search-completion notification message having an element of "0" is received, the device that is not the communication partner stops a connection to the second network NW2, thereby avoiding unnecessary processing.

After the search-completion notification message is transmitted, the system control unit 207 selects one address notified of by the communication partner determining unit 206 and connects with the device having the address via the second network NW2 through the communication control unit 210 and the second communication unit 213 (step S517). When there are a plurality of addresses notified of by the communication partner determining unit 206, the system control unit 207 selects one arbitrary address. For example, the system control unit 207 selects an address of the transmission source device of the search response message received at an earlier time out of the plurality of addresses.

Subsequently, the system control unit 207 reads content data from the content storage unit 214 and wirelessly transmits the content data to the communication partner device connected in step S517 through the communication control unit 210 and the second communication unit 213 (step S518). In the content data transmission process in step S518, the transmission data is packetized and data transmission control such as flow control is performed according to RTP. When the wireless transmission of the content data is completed, the digital camera 106 terminates processes.

According to the above process, it is possible to perform wireless communication of the content data via the second network NW2 between the content transmission terminal and an appropriate service providing device corresponding to the content and the action selected by the user.

Figure 6:
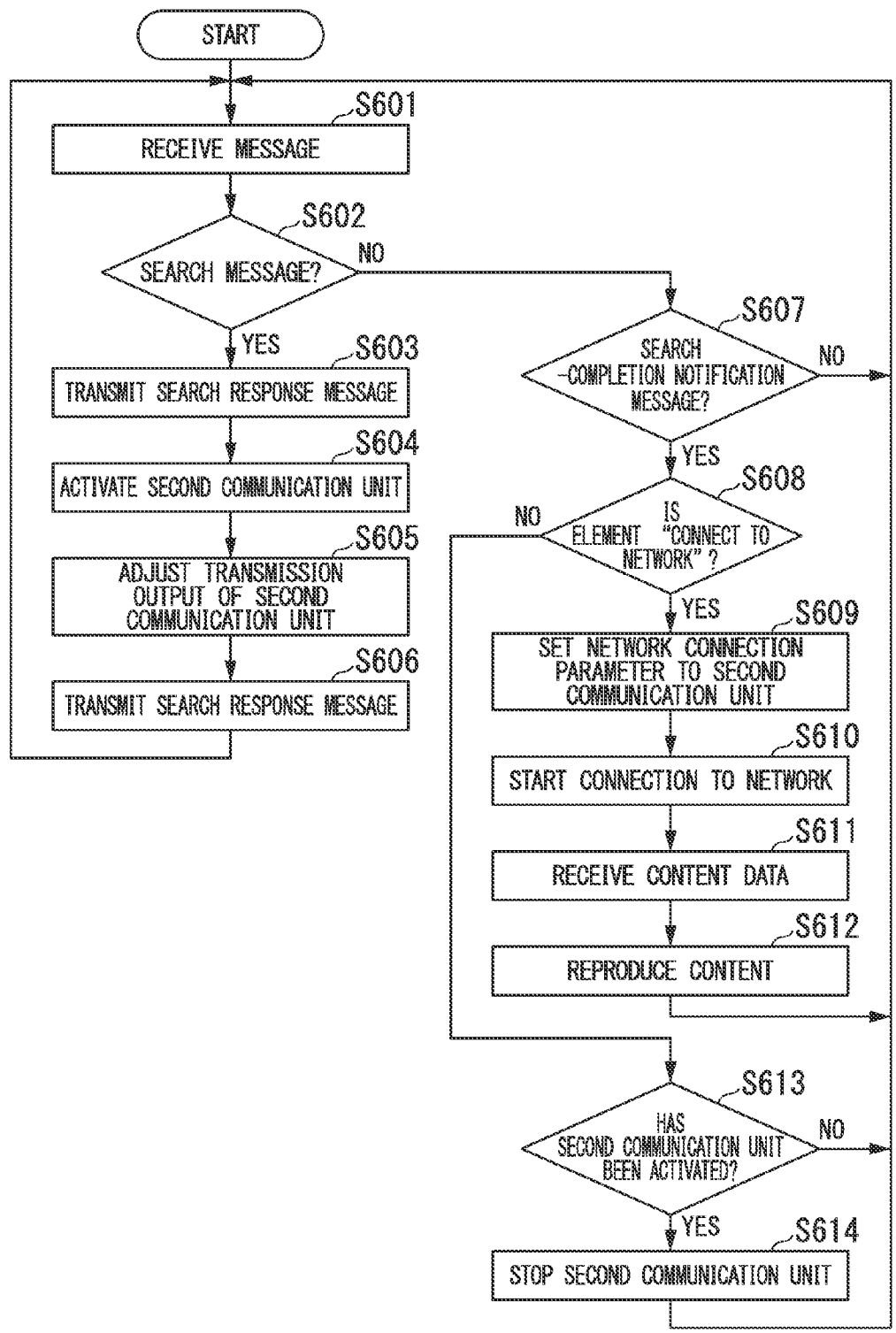
FIG. 6 is a flowchart illustrating operation procedures of the service providing device according to the embodiment of the invention.

Next, operations of the service providing device will be described. FIG. 6 illustrates a process up to operations of responding to the search message by the service providing device and enabling data reception by connecting to the second network NW2.

The service providing device is in a state in which a message can be received through the first communication unit 310.

When the message is received, the first communication unit 310 outputs the received message to the system control unit 306 through the communication control unit 308 (step S601). When the message is received, the system control unit 306 determines whether the received message is the search message (step S602).

When the received message is the search message, the system control unit 306 generates a search response message and transmits the search response message to the transmission source device of the search message through the communication control unit 308 and the first communication unit 310 (step S603). As illustrated in FIG. 17, the search response message includes a service identifier and a classification of the service providing device, and this information is stored in the DB unit 307 in advance.

Subsequently, the system control unit 306 activates the second communication unit 311 when the second communication unit 311 is not activated (step S604). Subsequently, the system control unit 306 adjusts the transmission output of the second communication unit 311 through the communication control unit 308 such that the transmission output corresponds to the search scope included in the search message (step S605). Subsequently, the system control unit 306 transmits the search response message transmitted in step S603 to the transmission source device of the search message through the communication control unit 308 and the second communication unit 311 (step S606).

On the other hand, when the message received through the first communication unit 310 is not the search message, the system control unit 306 determines whether the received message is the search-completion notification message (step S607). When the received message is not the search-completion notification message, the process returns to a state in which the message can be received. When the message is received, the first communication unit 310 outputs the received message to the system control unit 306 through the communication control unit 308 (step S601). The following process is the same as described above.

On the other hand, when the received message is the search-completion notification message, the system control unit 306 determines whether the element included in the search-completion notification message indicates to connect to the network (step S608). When the element included in the search-completion notification message indicates to connect to the network, the system control unit 306 sets the network connection parameters (SSID and passphrase) included in the search completion message in the second communication unit 311 through the communication control unit 308 (step S609).

Subsequently, the system control unit 306 is connected to the device having the address included in the search message through the communication control unit 308 and the second communication unit 311 via the second network NW2 (step S610). Subsequently, the system control unit 207 wirelessly receives content data from the communication partner device connected in step S610 through communication control unit 308 and the second communication unit 311 (step S611). In the content data reception process in step S611, the received packet is restored in the content data and data reception control such as flow control is performed according to RTP.

After the content data is processed in the content processing unit 312, when the received content data is, for example, image data, the content data is output to the output unit 301, and the image is displayed, and when the received content data is, for example, sound data, the content data is output to the output unit 301, and the sound is output (step S612). Subsequently, the process returns to a state that can receive the message. When the message is received, the first communication unit 310 outputs the received message to the system control unit 306 through the communication control unit 308 (step S601). The following process is the same as described above.

On the other hand, when the element included in the search-completion notification message indicates not to connect to the network, the system control unit 306 determines whether the second communication unit 311 is activated (step S613). When the second communication unit 311 is activated, the second communication unit 311 stops (step S614). Subsequently, the process returns to a state in which the message can be received. When the message is received, the first communication unit 310 outputs the received message to the system control unit 306 through the communication control unit 308 (step S601). The following process is the same as described above.

According to the above process, the service providing device receiving a request from the content transmission terminal is connected to the network built by the content transmission terminal and can provide a service.

In the operations of FIGS. 5 and 6, the service providing device that is the communication partner is detected among the service providing devices connected to the first network NW1 as a detecting target. In this way, it is possible to more reliably detect the communication partner compared to when the service providing device is detected while increasing the transmission output without knowing whether there are any service providing devices to be detected.

Moreover, since communication of the content is performed via the second network NW2 without the first network NW1, it is possible to suppress an influence on communication performed by another device connected to the first network NW1.

Further, when the search response message is received in the first communication unit 212 from the service providing device that provides a desired service and the search response message is not received in the second communication unit 213, the search message specifying a broader search scope (a higher transmission output) is transmitted. In this way, it is possible to detect the service providing device within a minimum communication range from the content transmission terminal. Moreover, since the content transmission terminal performs wireless communication of content data with the service providing device within a minimum communication range, it is possible to decrease effects of interference on wireless communication performed by another device.

Moreover, when the search response message is not received in the first communication unit 212 from the service providing device that provides a desired service, it is understood that the service providing device that provides a desired service is not connected to the first network NW1. In this way, it is possible to avoid unnecessary power consumption in both of the content transmission terminal and the service providing device by stopping the detection of the service providing device.

(A Search Response Message is Received from Only a Device Capable of Providing a Desired Service Among Devices Present in the First Network NW1)

In the operation example in FIGS. 5 and 6, all devices present in the first network NW1 are first detected. Among them, the device that provides a desired service is detected, and communication is performed with the device via the second network NW2. Hereinafter, with reference to FIGS. 7 and 8, a case in which the search response message is received from only the device that can provide a desired service will be described.

Figure 7:
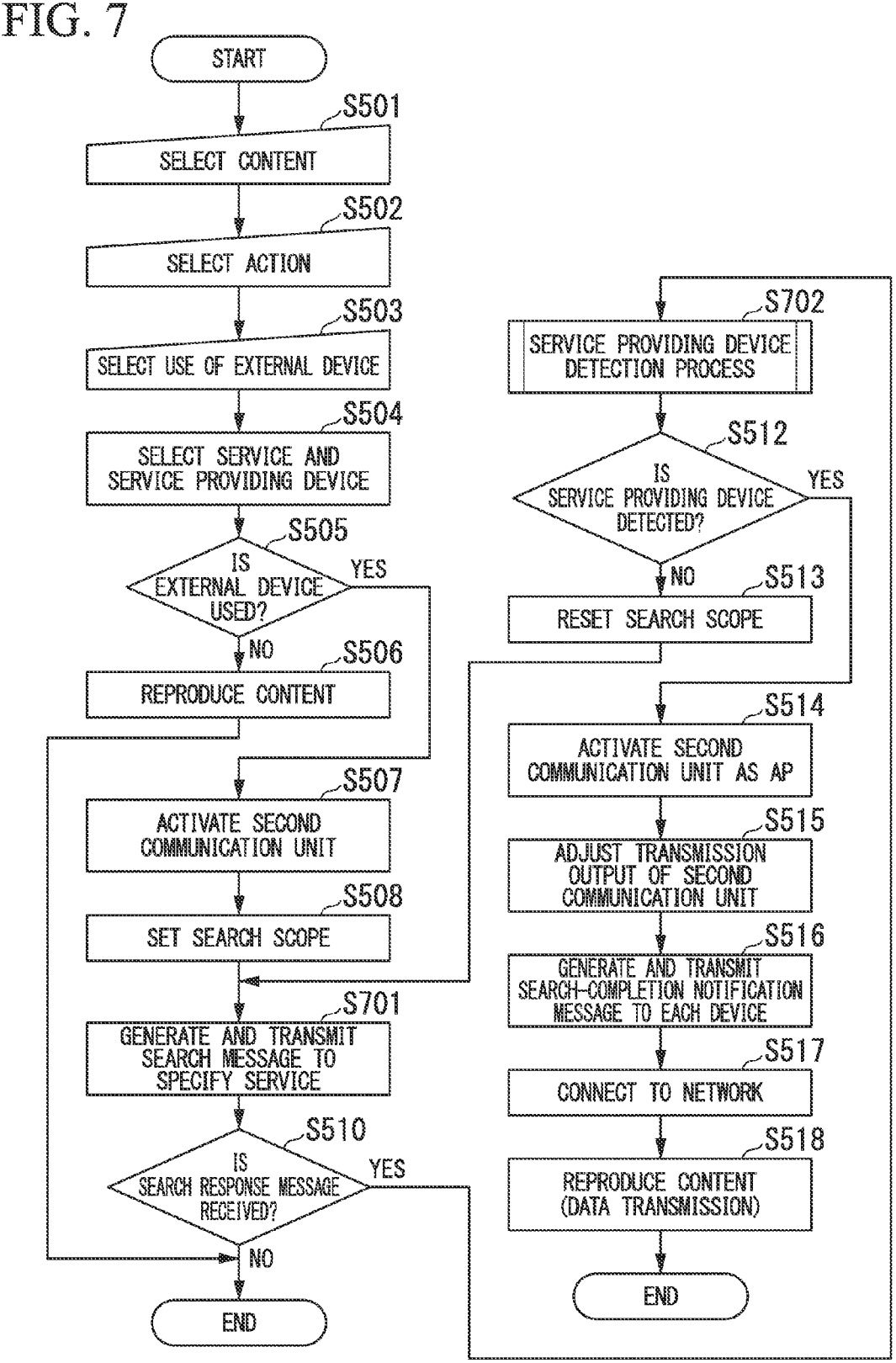
FIG. 7 is a flowchart illustrating operation procedures of the content transmission terminal according to the embodiment of the invention.

FIG. 7 illustrates a process up to operations of searching for the service providing device of the communication partner by the content transmission terminal, and enabling data transmission by building the second network NW2. In FIG. 7, the same processes are denoted by the same step numerals as in FIG. 5. In the process illustrated in FIG. 5, the search message is transmitted to all devices connected to the first network NW1. However, in the process illustrated in FIG. 7, the search message specifying a desired service is transmitted such that only the device capable of providing a desired service transmits the search response message among devices connected to the first network NW1. Hereinafter, processes different from those in FIG. 5 will be described.

After the search scope is set in step S508, the system control unit 207 generates a search message including the search scope information and the service identifier, and transmits the search message through the communication control unit 210 and the first communication unit 212 (step S701). FIG. 16B illustrates a format of the search message and an example of the search message which corresponds to the operations illustrated in FIG. 7. The search message includes an own address, a search scope, and a service identifier (service information). The service identifier is a service identifier of the service selected in step S504.

The device that has received the search message including the service identifier transmits the search response message when the service provided by the device matches the service corresponding to the service identifier included in the search message. Accordingly, the content transmission terminal allows only the service providing device that provides a desired service to transmit the search response message from the first and second communication units 310 and 311.

Figure 24:
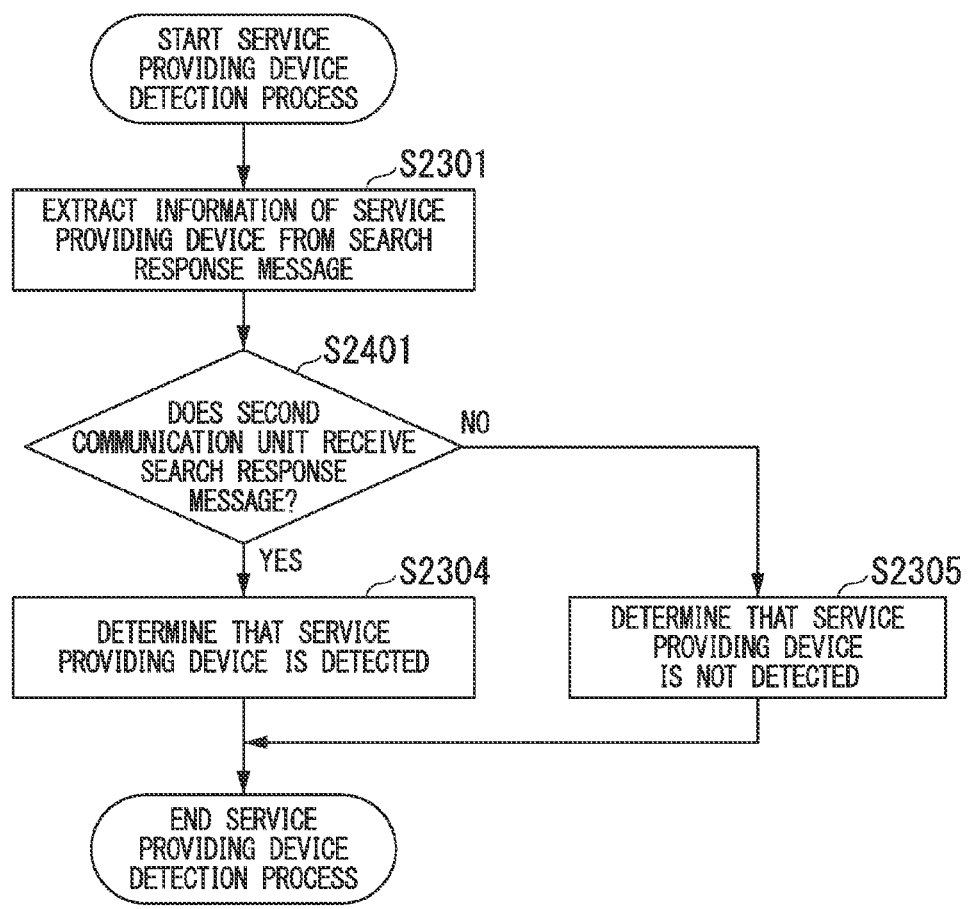
FIG. 24 is a flowchart illustrating operation procedures of the content transmission terminal according to the embodiment of the invention.

The service providing device detecting process in step S702 in FIG. 7 differs from the service providing device detecting process in step S511 in FIG. 5. FIG. 24 illustrates details of the service providing device detecting process in step S702. In FIG. 24, the same processes are denoted by the same step numerals as in FIG. 23. Hereinafter, processes different from those in FIG. 23 will be described.

As described above, since the content transmission terminal allows only the service providing device that provides a desired service to transmit the search response message, checking of the service based on the search response message is unnecessary. Moreover, since determination of whether the device that provides a desired service is connected to the first network NW1 is checked in step S510, a process corresponding to step S2302 in FIG. 23 is unnecessary.

After information on the service providing device, which is a transmission source of the search response message, is extracted from the search response message received in each of the first and second communication units 212 and 213 in step S2301, the communication partner determining unit 206 determines whether the search response message is received in the second communication unit 213 (step S2401). When there is at least one search response message received in the second communication unit 213, it is determined that the search response message is received in the second communication unit 213 from the device that provides a desired service. In addition, when there is no search response message received in the second communication unit 213, it is determined that the search response message is not received in the second communication unit 213 from the device that provides a desired service. The following process is the same as described above.

Figure 8:
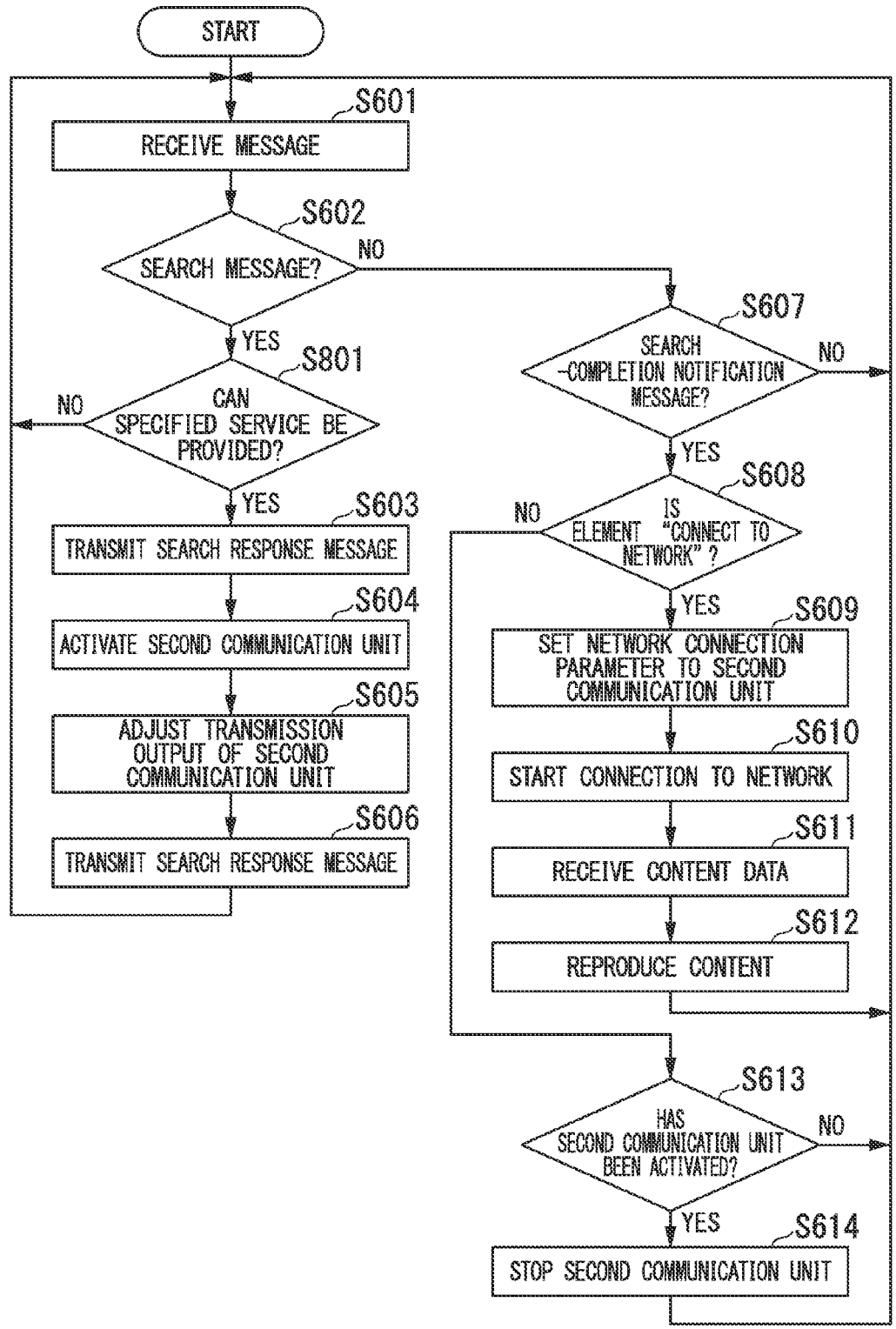
FIG. 8 is a flowchart illustrating operation procedures of the service providing device according to the embodiment of the invention.

FIG. 8 illustrates a process up to operations of responding to the search message by the service providing device and enabling data reception by connecting to the second network NW2. In FIG. 8, the same processes are denoted by the same step numerals as in FIG. 6. In the process in FIG. 6, the search response message is unconditionally transmitted with respect to the received search message. However, in the process in FIG. 8, the search response message is transmitted only when an own device can provide a service specified in the search message. Hereinafter, processes different from those in FIG. 6 will be described.

When the message received in step S602 is the search message, the system control unit 306 determines whether an own device is able to provide the service specified in the search message (step S801). In step S801, the system control unit 306 extracts the service identifier from the search message, and checks whether the extracted service identifier matches the service identifier that is stored in the DB unit 307 and corresponds to the service that can be provided by the own device. When the service identifier extracted from the search message matches the service identifier corresponding to the service that can be provided by the own device, the own device can provide the service specified in the search message. Moreover, when the service identifier extracted from the search message does not match the service identifier corresponding to the service that can be provided by the own device, the own device may not provide the service specified in the search message.

When the own device can provide the service specified in the search message, the search response message is transmitted in step S603. On the other hand, when the own device may not provide the service specified in the search message, the process returns to a state in which the message can be received. When the message is received, the first communication unit 310 outputs the received message to the system control unit 306 through the communication control unit 308 (step S601). The following process is the same as described above.

In the operations in FIGS. 7 and 8, the service identifier is included in the search message, and only the device capable of providing a desired service transmits the search response message among devices connected to the first network NW1. In this way, the content transmission terminal can efficiently detect the service providing device that is a communication partner, and it is possible to avoid unnecessary power consumption due to the search response message transmission from the device incapable of providing a desired service.

(A User Selects a Desired Service Providing Device Among a Plurality of Detected Service Providing Devices)

According to the search scope and installation conditions of the device, when a plurality of devices that can provide the same service are detected, a user selecting the communication partner device can be considered. Hereinafter, with reference to FIG. 9, a case in which the user selects the communication partner device will be described.

Figure 9:
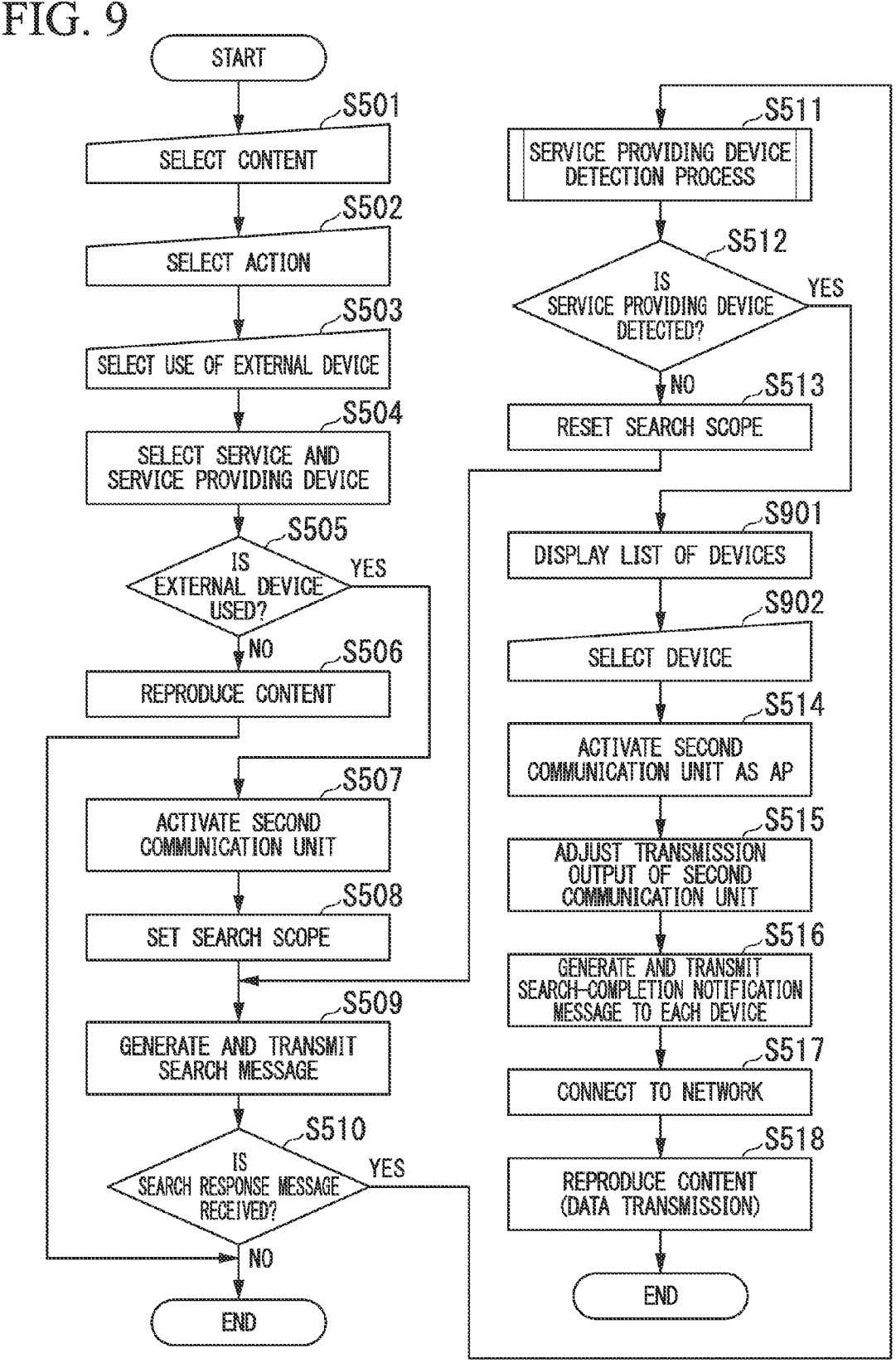
FIG. 9 is a flowchart illustrating operation procedures of the content transmission terminal according to the embodiment of the invention.

FIG. 9 illustrates a process up to operations of searching for the service providing device of the communication partner by the content transmission terminal and enabling data transmission by building the second network NW2. In FIG. 9, the same processes are denoted by the same step numerals as in FIG. 5. In the process in FIG. 5, when the plurality of service providing devices are detected, an arbitrary service providing device is selected as the communication partner. However, in the process in FIG. 7, when the plurality of service providing devices are detected, the service providing device selected by the user is used as the communication partner. Hereinafter, processes different from those in FIG. 5 will be described.

When the service providing device is detected in step S512, the system control unit 207 displays the communication partner information notified of by the communication partner determining unit 206 on the display unit 201 as, for example, a list of devices that can communicate (step S901). The user selects a device desired as the communication partner in the list of displayed devices (step S902). In this case, the user uses the input unit 202 to select the device. The system control unit 207 is notified by the input unit 202 of information on the device selected by the user. Subsequently, the second communication unit 213 is activated as the access point in step S514. Then, in step S517, connection is performed with respect to the device selected in step S902 via the second network NW2.

According to the above process, when the plurality of service providing devices are detected, it is possible for the user to select the desired service providing device.

(Example of Search Scope)

Figure 10:
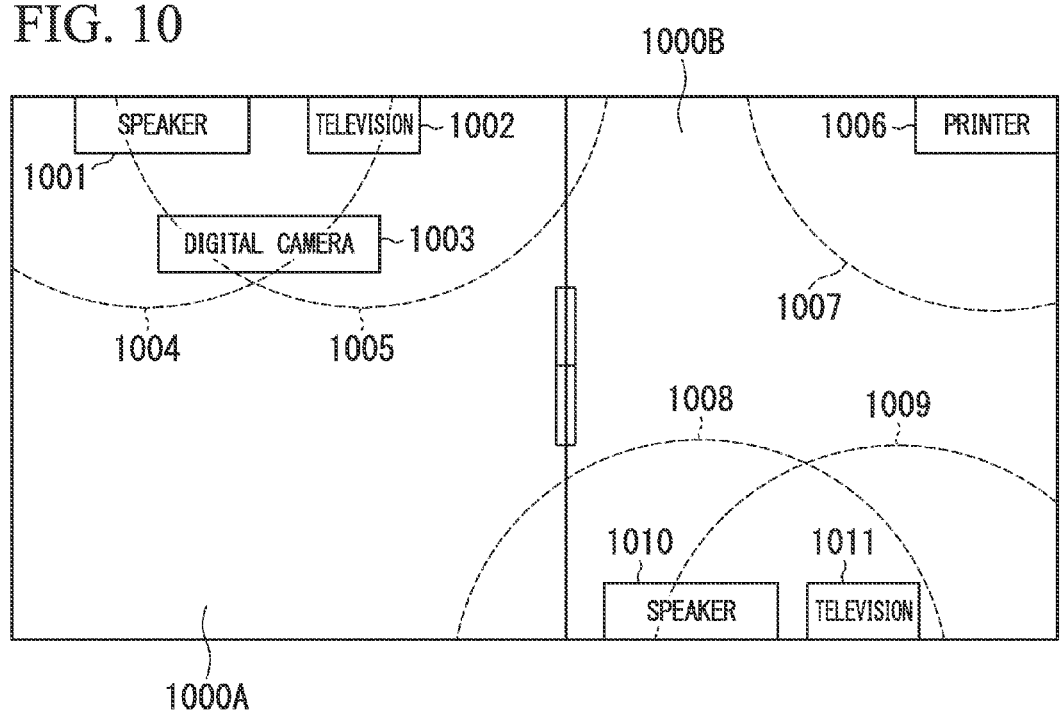
FIG. 10 is a reference diagram illustrating a search scope according to the embodiment of the invention.
Figure 11:
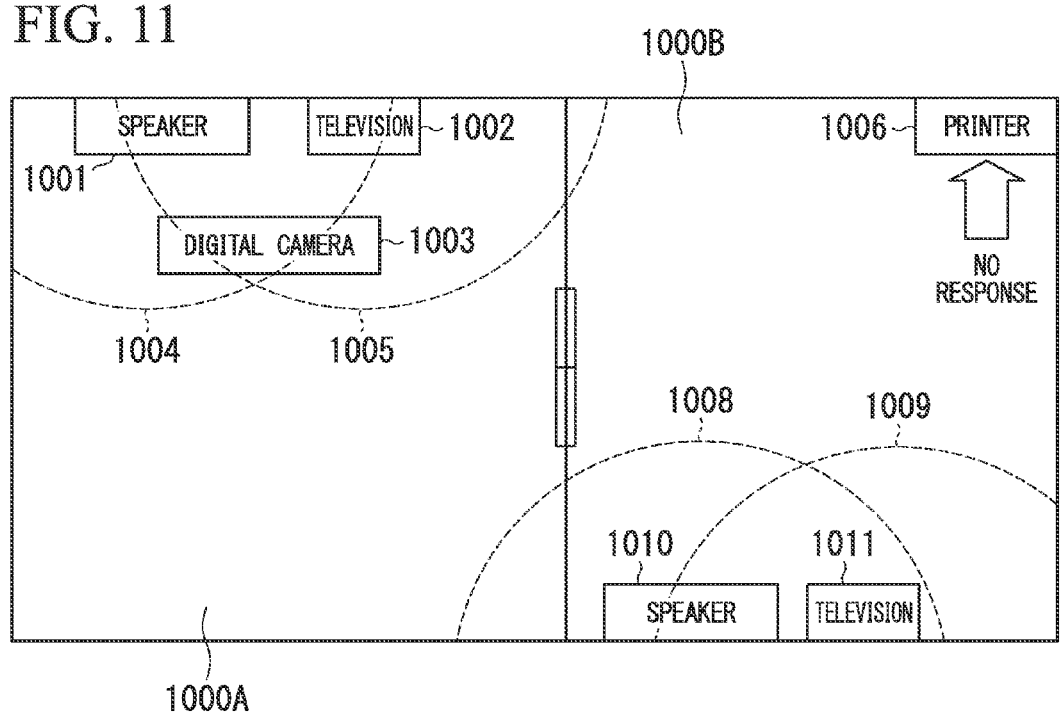
FIG. 11 is a reference diagram illustrating a search scope according to the embodiment of the invention.

FIGS. 10 and 11 illustrate the search scope specified in the search message. As illustrated in FIGS. 10 and 11, there are, for example, rooms 1000A and 1000B. In the room 1000A, a speaker 1001 and a TV 1002 are provided, and a digital camera 1003 is also present. On the other hand, in the room 1000B, a printer 1006, a speaker 1010, and a TV 1011 are provided. When the digital camera 1003 wishes to reproduce content using the TV or the speaker, the digital camera 1003 specifies the search scope and transmits the search message.

After the device such as the speaker or TV receives the search message, and adjusts the transmission output of the second communication unit 311 to correspond to the search scope specified in the search message, communication ranges of each of the devices are communication ranges 1004, 1005, 1007, 1008 or 1009. In this way, when the digital camera 1003 specifies the search scope and transmits the search message, the communication ranges of the speaker 1001 and the TV 1002 are respectively communication ranges 1004 and 1005. The digital camera 1003 can receive the search response message from only the speaker 1001 and the TV 1002 through the second communication unit 213.

FIG. 10 shows an example in which all devices present in the first network NW1 transmit the search response message through the second communication unit 311. Accordingly, even when the digital camera 1003 wishes to reproduce video data, the printer 1006 capable of providing only a printing service also adjusts the transmission output of the second communication unit 311, sets the communication range 1007, and transmits the search response message. Since the digital camera 1003 is not present in the communication range of the printer 1006, the digital camera 1003 does not receive the search response message from the printer 1006 through the second communication unit 213.

FIG. 11 shows an example in which only the device capable of providing a desired service among devices present in the first network NW1 transmits the search response message through the second communication unit 311. When the digital camera 1003 wishes to reproduce video data, the printer 1006 incapable of providing the video reproduction service does not transmit the search response message even when the search message is received.

Figure 12:
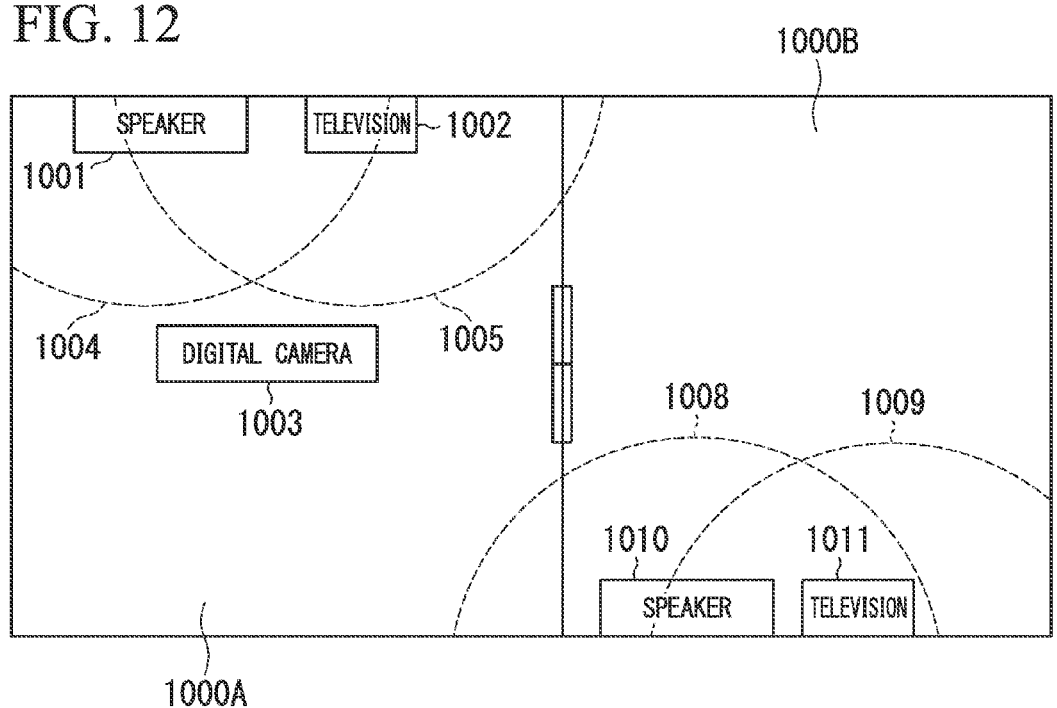
FIG. 12 is a reference diagram illustrating a search scope according to the embodiment of the invention.
Figure 13:
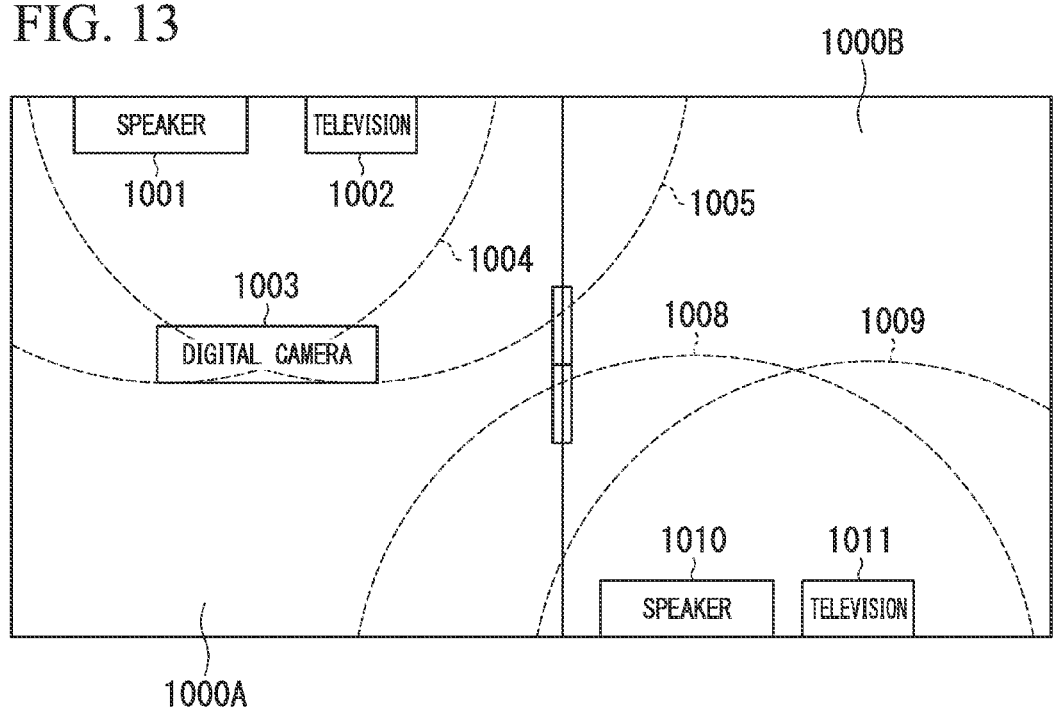
FIG. 13 is a reference diagram illustrating a search scope according to the embodiment of the invention.

FIGS. 12 and 13 show examples in which the device capable of providing a desired service is not detected in the specified search scope regardless of whether the digital camera 1003 receives the search response message from the device capable of providing a desired service through the first communication unit 212. As illustrated in FIG. 12, although the digital camera 1003 wishes to reproduce video data using the TV 1002 or the speaker 1001, the digital camera 1003 is not present within the communication ranges 1004 and 1005 of the speaker 1001 and the TV 1002 that correspond to the search scope initially specified by the digital camera 1003. Therefore, the digital camera 1003 may not receive the search response message from the speaker 1001 and the TV 1002 through second communication unit 311.

In this case, according to step S513 in FIGS. 5, 7, and 9, the digital camera 1003 specifies a broader search scope than the previously specified search scope and retransmits the search message. FIG. 13 shows an example of the communication range of each device that has received the search message including the re-specified search scope. Since the search scope becomes broader, the digital camera 1003 is present in the communication ranges 1004 and 1005 of the speaker 1001 and the TV 1002. In this way, the digital camera 1003 receives the search response message transmitted from the speaker 1001 and the TV 1002.

FIG. 22 shows an example of values that can be specified as the search scope in the search message. In the example in FIG. 22, the search scope is specified by a parameter corresponding to a distance. For example, when the search scope of 1 m is specified, the parameter is 1, and when the search scope of 2 m is specified, the parameter is 2.

The transmission output set in the second communication units 213 and 311 is calculated according to the value of the search scope shown in FIG. 22. In each device, a maximum communication distance and a maximum output are predetermined. The transmission output is calculated according to the following equation (1). For example, when the search scope is 3 m, the maximum communication distance is 30 m, and the maximum output is 10 W, the transmission output is 1 W, which is one tenth of the maximum output 10 W.

$$\text{Transmission output} = \text{maximum output} \times (\text{search scope}/\text{maximum communication distance}) \qquad (1)$$

The content transmission terminal (for example, the digital camera 106) according to the embodiment corresponds to a top-level concept of the content transmission terminal in the invention. The content transmission terminal of the invention may include, for example, the first communication unit 212 as a first communication unit in the content transmission terminal of the invention, the second communication unit 213 as a second communication unit in the content transmission terminal of the invention, the system control unit 207 as a selecting unit in the content transmission terminal of the invention, the search scope determining unit 215 as an output level determining unit in the content transmission terminal of the invention, the response control unit 203 as a response control unit in the content transmission terminal of the invention, and the communication partner determining unit 206 as a device determining unit in the content transmission terminal of the invention. The content transmission terminal of the invention may not include a component (for example, the display unit 201) that is not mandatory in implementing the terminal.

The service providing device (for example, the TV 105 or the speaker 107) according to the embodiment corresponds to a top-level concept of the service providing device in the invention. The service providing device of the invention may include, for example, the first communication unit 310 as a first communication unit or a third communication unit in the service providing device of the invention, the second communication unit 311 as a second communication unit or a fourth communication unit in the service providing device of the invention, the response unit 302 as a response unit in the service providing device of the invention, and the content processing unit 312 as a service providing unit in the service providing device of the invention. The service providing device of the invention may not include a component (for example, the data reception control unit 309) that is not mandatory to implement the device.

According to the embodiment as described above, it is possible to more reliably detect the communication partner, and to suppress the influence on communication performed by another device connected to the first network NW1.

In addition, the content transmission terminal searches for the service providing device that provides a desired service while the search scope becomes gradually broader. As a result, it is possible to detect the service providing device that is in a minimum communication range from the content transmission terminal. Furthermore, since the content transmission terminal performs wireless communication of content data with the service providing device that is in the minimum communication range, it is possible to decrease effects of interference on wireless communication performed by another device.

Moreover, when the search response message is not received in the first communication unit 212 from the service providing device that provides a desired service, detection of the service providing device stops. In this way, it is possible to avoid unnecessary power consumption in both of the content transmission terminal and the service providing device.

Furthermore, the content transmission terminal transmits the search message including the service identifier, and only the device capable of providing a desired service among devices connected to the first network NW1 transmits the search response message. In this way, the content transmission terminal can efficiently detect the service providing device, which is a communication partner, and it is possible to avoid unnecessary power consumption due to the search response message transmission from the device incapable of providing a desired service.

Moreover, when the plurality of service providing devices are detected, it is possible for the user to select a desired service providing device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A content transmission terminal that performs first communication via a first network including an access point and wirelessly performs second communication via a second network without the first network, the content transmission terminal comprising:

a first communication unit being executed by a computer processor to perform the first communication with a service providing device that provides a service corresponding to content and controls an output level of wireless transmission;

a second communication unit being executed by the computer processor to perform the second communication with the service providing device;

a selecting unit being executed by the computer processor to select the service;

an output level determining unit being executed by the computer processor to determine an output level of wireless transmission for communicating with the service providing device;

a response control unit being executed by the computer processor to transmit, from the first communication unit to the service providing device, a response request message for requesting a response of the first and second communication from the service providing device and instruction information for setting an output level when the service providing device wirelessly transmits a response message corresponding to the response request message to the output level determined by the output level determining unit; and a device determining unit being executed by the computer processor to determine the service providing device of a communication partner which performs wireless communication of the content based on the service selected by the selecting unit and on the response message received in the first and second communication units from the service providing device, wherein, after the response control unit transmits the response request message and the instruction information from the first communication unit to the service providing device, in a first case in which the response message is received in the first and second communication units from the service providing device that provides the service selected by the selecting unit, the device determining unit determines the service providing device that has transmitted a corresponding response message as the communication partner, and the second communication unit wirelessly transmits content to the service providing device of the communication partner, in a second case, other than that of the first case, in which the response message is received in only the first communication unit from the service providing device that provides the service selected by the selecting unit, the output level determining unit determines a higher output level than the output level determined before transmission of the previous response request message, and the response control unit transmits the response request message and the instruction information from the first communication unit to the service providing device, and in a third case, other than those of the first and second cases, in which the response message is not received in the first communication unit from the service providing device that provides the service selected by the selecting unit, the second communication unit does not wirelessly transmit content.

2. The content transmission terminal according to claim 1, wherein, in the first case, the second communication unit wirelessly transmits the content to the service providing device of the communication partner with an output level corresponding to the output level determined by the output level determining unit.

3. The content transmission terminal according to claim 1, further comprising a storage unit configured to store information indicating a corresponding relationship between a service and the service providing device, wherein the device determining unit determines the service providing device of the communication partner that performs wireless communication of the content based on the service selected by the selecting unit, the information stored in the storage unit, and the response message received in the first and second communication units from the service providing device.

4. The content transmission terminal according to claim 1, wherein the response control unit transmits the response request message including the instruction information from the first communication unit to the service providing device.

5. The content transmission terminal according to claim 1, wherein the first communication is wired communication.

6. The content transmission terminal according to claim 1, wherein, in the first case, the second communication unit serves as the access point.

7. The content transmission terminal according to claim 1,
wherein, in the first case, when the response message is received in the first and second communication units from the plurality of service providing devices that provide the service selected by the selecting unit, the device determining unit determines the service providing device selected based on a user instruction from among the plurality of service providing devices that have transmitted the response message as the communication partner.

8. The content transmission terminal according to claim 1,
wherein, in the third case, the response control unit controls to transmit, from the first communication unit, a notification message for notifying that wireless transmission of the content is not performed to the service providing device that the response message is received in the first communication unit and the response message is not received in the second communication unit.

9. The content transmission terminal according to claim 1, wherein the response control unit transmits the response request message, the instruction information, and service information indicating the service selected by the selecting unit from the first communication unit to the service providing device, and the device determining unit determines the service providing device of the communication partner that performs wireless communication of content based on the response message received in the first and second communication units from the service providing device that receives the response request message and the instruction information and provides the service indicated by corresponding service information.

10. The content transmission terminal according to claim 1, further comprising a storage unit configured to store information indicating a corresponding relationship among a service, a type of content, and the service providing device, wherein the selecting unit selects the service and the type of content, and the device determining unit determines the service providing device of the communication partner that performs wireless communication of content based on the service and the type of content selected by the selecting unit, the information stored in the storage unit, and the response message received in the first and second communication units from the service providing device.

11. A service providing device comprising:
a first communication unit being executed by a computer processor to perform first communication via a first network including an access point, wirelessly perform second communication via a second network without the first network, and perform the first communication with a content transmission terminal that wirelessly transmits content;
a second communication unit being executed by the computer processor to perform the second communication with the content transmission terminal;
a response unit being executed by a computer processor to, when a response request message for requesting a response of the first and second communication and instruction information for setting an output level when a response message corresponding to the response request message is wirelessly transmitted, are received in the first communication unit from the content transmission terminal, set an output level of the second communication unit to the output level based on the instruction information, and transmit the response message from the first and second communication units to the content transmission terminal; and
a service providing unit being executed by the computer processor to provide a service corresponding to the content which is transmitted from the content transmission terminal and be wirelessly received in the second communication unit after the response message is transmitted.

12. The service providing device according to claim 11, wherein, the response unit, when the response request message including the instruction information is received in the first communication unit from the content transmission terminal, sets an output level of the second communication unit to the output level based on the instruction information, and transmits the response message from the first and second communication units to the content transmission terminal.

13. The service providing device according to claim 11, wherein the first communication is wired communication.

14. The service providing device according to claim 11, wherein, the response unit, when a notification message for notifying that wireless transmission of the content is not performed is received in the first communication unit from the content transmission terminal, stops the second communication unit.

15. The service providing device according to claim 11, wherein, the response unit, when the response request message, the instruction information, and service information indicating the service selected by the content transmission terminal are received in the first communication unit from the content transmission terminal, and an own service providing device provides the service indicated by the service information, sets an output level of the second communication unit to the output level based on the instruction information and transmits the response message from the first and second communication units to the content transmission terminal.

16. A communication system having a content transmission terminal and a service providing device that perform first communication via a first network including an access point and wirelessly perform second communication via a second network without the first network, wherein the content transmission terminal comprising:
a first communication unit being executed by a first computer processor to perform the first communication with the service providing device;
a second communication unit being executed by the first computer processor to perform the second communication with the service providing device;

a selecting unit being executed by the first computer processor to select a service;
an output level determining unit being executed by the first computer processor to determine an output level of wireless transmission for communicating with the service providing device;
a response control unit being executed by the first computer processor to transmit, from the first communication unit to the service providing device, a response request message for requesting a response of the first and second communication from the service providing device and instruction information for setting an output level when the service providing device wirelessly transmits a response message corresponding to the response request message to the output level determined by the output level determining unit; and
a device determining unit being executed by the first computer processor to determine the service providing device of a communication partner which performs wireless communication of the content based on the service selected by the selecting unit and the response message received in the first and second communication units from the service providing device,
wherein, after the response control unit transmits the response request message and the instruction information from the first communication unit to the service providing device,
in a first case in which the response message is received in the first and second communication units from the service providing device that provides the service selected by the selecting unit, the device determining unit determines the service providing device that has transmitted a corresponding response message is determined as the communication partner, and the second communication unit wirelessly transmits content to the service providing device of the communication partner,
in a second case, other than that of the first case, in which the response message is received in only the first communication unit from the service providing device that provides the service selected by the selecting unit, the output level determining unit determines a higher output level than the output level determined before transmission of the previous response request message, and the response control unit transmits the response request message and the instruction information from the first communication unit to the service providing device, and
in a third case, other than those of the first and second cases, in which the response message is not received in the first communication unit from the service providing device that provides the service selected by the selecting unit, the second communication unit does not wirelessly transmit the content, and
wherein the service providing device comprising:
a third communication unit being executed by a second computer processor to perform the first communication with the content transmission terminal;
a fourth communication unit being executed by the second computer processor to perform the second communication with the content transmission terminal;
a response unit being executed by the second computer processor to, when the response request message and the instruction information are received in the third communication unit from the content transmission terminal, set an output level of the fourth communication unit to the output level based on the instruction information, and transmit the response message from the third and fourth communication unit to the content transmission terminal; and
a service providing unit being executed by the second computer processor to provide a service corresponding to the content which is transmitted from the content transmission terminal and be wirelessly received in the fourth communication unit after the response message is transmitted.

17. A communication method performed by a content transmission terminal configured to perform first communication via a first network including an access point, wirelessly perform second communication via a second network without the first network, and includes a first communication unit being executed by a computer processor to perform the first communication with a service providing device which provides a service corresponding to content and controls an output level of wireless transmission, and a second communication unit being executed by the computer processor that performs the second communication with the service providing device, the method comprising:
selecting the service;
determining an output level of wireless transmission for communicating with the service providing device;
transmitting a response request message for requesting a response of the first and second communication from the service providing device and instruction information for setting an output level when the service providing device wirelessly transmits a response message corresponding to the response request message to the determined output level, from the first communication transceiver to the service providing device; and
determining the service providing device of a communication partner which performs wireless communication of the content based on the selected service and the response message received in the first and second communication units from the service providing device,
wherein, after the response request message and the instruction information are transmitted from the first communication unit to the service providing device,
in a first case in which the response message is received in the first and second communication units from the service providing device that provides the selected service, the service providing device that has transmitted a response message is determined as the communication partner, and the content is wirelessly transmitted from the second communication unit to the service providing device of the communication partner;
in a second case, other than that of the first case, in which the response message is received in only the first communication unit from the service providing device that provides the selected service, a higher output level than the output level determined before transmission of the previous response request message is determined, and the response request message and the instruction information are transmitted from the first communication unit to the service providing device; and
in a third case, other than those of the first and second cases, in which the response message is not received in the first communication unit from the service providing device that provides the selected service, the content is not wirelessly transmitted from the second communication unit.

18. A communication method performed by a service providing device configured to perform first communication via a first network including an access point and wirelessly perform second communication via a second network without the first network, and includes a first communication unit being executed by a computer processor to perform the first communication with a content transmission terminal that wirelessly transmits content, and a second communication unit being executed by the computer processor to perform the second communication with the content transmission terminal, the method comprising:

setting, when a response request message for requesting a response of the first and second communication and instruction information for setting an output level when a response message corresponding to the response request message is wirelessly transmitted, are received in the first communication unit from the content transmission terminal, an output level of the second communication unit to the output level based on the instruction information, and transmitting the response message from the first and second communication units to the content transmission terminal; and providing a service corresponding to the content which is transmitted from the content transmission terminal and is wirelessly received in the second communication unit after the response message is transmitted.

19. A non-transitory computer-readable recording device that records a program executed by a computer of a content transmission terminal configured to perform first communication via a first network including an access point and wirelessly perform second communication via a second network without the first network, and includes a first communication unit executed by the computer to perform the first communication with a service providing device that provides a service corresponding to content and controls an output level of wireless transmission, and a second communication unit executed by the computer to perform the second communication with the service providing device, the program causing the computer to execute:

selecting the service;

determining an output level of wireless transmission for communicating with the service providing device;

transmitting a response request message for requesting a response of the first and second communication from the service providing device and instruction information for setting an output level when the service providing device wirelessly transmits a response message corresponding to the response request message to the determined output level, from the first communication unit to the service providing device; and determining the service providing device of a communication partner which performs wireless communication of content based on the selected service and the response message received in the first and second communication units from the service providing device, wherein, after the response request message and the instruction information are transmitted from the first communication unit to the service providing device, in a first case in which the response message is received in the first and second communication unit from the service providing device that provides the selected service, the service providing device that has transmitted a response message is determined as the communication partner, and the content is wirelessly transmitted from the second communication unit to the service providing device of the communication partner;

in a second case, other than that of the first case, in which the response message is received in only the first communication unit from the service providing device that provides the selected service, a higher output level than the output level determined before transmission of the previous response request message is determined, and the response request message and the instruction information are transmitted from the first communication unit to the service providing device; and in a third case, other than those of the first and second cases, in which the response message is not received in the first communication unit from the service providing device that provides the selected service, the content is not wirelessly transmitted from the second communication unit.

20. A non-transitory computer-readable recording device that records a program executed by a computer of a service providing device configured to perform first communication via a first network including an access point and wirelessly perform second communication via a second network without the first network, and includes a first communication unit being executed by a computer processor to perform which performs the first communication with a content transmission terminal that wirelessly transmits content and a second communication unit being executed by the computer processor to perform the second communication with the content transmission terminal, the program causing the computer to execute:

setting, when a response request message for requesting a response of the first and second communication and instruction information for setting an output level when a response message corresponding to the response request message is wirelessly transmitted, are received in the first communication unit from the content transmission terminal, an output level of the second communication unit to the output level based on the instruction information and transmitting the response message from the first and second communication units to the content transmission terminal; and providing a service corresponding to the content which is transmitted from the content transmission terminal and is wirelessly received in the second communication unit after the response message is transmitted.

* * * * *